US012358282B2

(12) United States Patent
Aimono

(10) Patent No.: US 12,358,282 B2
(45) Date of Patent: Jul. 15, 2025

(54) DRIVING METHOD OF LIQUID EJECTING HEAD AND LIQUID EJECTING APPARATUS

(71) Applicant: SEIKO EPSON CORPORATION, Tokyo (JP)

(72) Inventor: Takanori Aimono, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 175 days.

(21) Appl. No.: 18/177,596

(22) Filed: Mar. 2, 2023

(65) Prior Publication Data

US 2023/0286266 A1 Sep. 14, 2023

(30) Foreign Application Priority Data

Mar. 3, 2022 (JP) ................................ 2022-032346

(51) Int. Cl.
*B41J 2/045* (2006.01)

(52) U.S. Cl.
CPC ....... *B41J 2/04573* (2013.01); *B41J 2/04541* (2013.01); *B41J 2/04581* (2013.01)

(58) Field of Classification Search
CPC ................ B41J 2/04573; B41J 2/04541; B41J 2/04581; B41J 2/04525; B41J 2/0459; B41J 2/04591; B41J 2202/11; B41J 2202/12; B41J 2/04596; B41J 2002/14419; B41J 2/14233; B41J 2/04588
See application file for complete search history.

(56) References Cited

U.S. PATENT DOCUMENTS

2019/0283421 A1 9/2019 Miyazawa et al.
2020/0307210 A1* 10/2020 Takabe ................ B41J 2/14201
2021/0331467 A1* 10/2021 Murayama .............. B41J 2/175

FOREIGN PATENT DOCUMENTS

CN 111746118 A * 10/2020 ............... B41J 2/01
JP 2010274446 A * 12/2010
JP 2019-155768 A 9/2019

* cited by examiner

*Primary Examiner* — Douglas X Rodriguez
*Assistant Examiner* — Tracey M McMillion
(74) *Attorney, Agent, or Firm* — WORKMAN NYDEGGER

(57) ABSTRACT

A liquid ejecting head includes a nozzle, first and second pressure chambers communicating with the nozzle, a first driving element configured to change a pressure in the first pressure chamber, and a second driving element configured to change a pressure in the second pressure chamber. A first flow path length of a flow path from the first pressure chamber to the nozzle is shorter than a second flow path length of a flow path from the second pressure chamber to the nozzle. In a driving method of a liquid ejecting head, at least the first and second driving elements are driven to eject a liquid from the nozzle, and a driving timing of the second driving element is earlier than a driving timing of the first driving element.

20 Claims, 20 Drawing Sheets

DRIVING METHOD OF LIQUID EJECTING HEAD AND LIQUID EJECTING APPARATUS

The present application is based on, and claims priority from JP Application Serial Number 2022-032346, filed Mar. 3, 2022, the disclosure of which is hereby incorporated by reference herein in its entirety.

BACKGROUND

1. Technical Field

The present disclosure relates to a driving method of a liquid ejecting head, and a liquid ejecting apparatus.

2. Related Art

JP-A-2019-155768 discloses a liquid ejecting head in which four pressure chambers are provided on both sides of a nozzle, and flow paths from each of the four pressure chambers to the nozzle are joined near the nozzle.

However, in the related art, a drive control when a liquid ejecting head that ejects a liquid from one nozzle using a plurality of pressure chambers is used was not sufficiently considered.

SUMMARY

A first aspect of the present disclosure is a driving method of a liquid ejecting head. The liquid ejecting head includes a nozzle for ejecting a liquid, first and second pressure chambers communicating with the nozzle, a first driving element that changes the pressure in the first pressure chamber, and a second driving element that changes the pressure in the second pressure chamber. A first flow path length of a flow path from the first pressure chamber to the nozzle is shorter than a second flow path length of a flow path from the second pressure chamber to the nozzle. In the driving method of a liquid ejecting head, at least the first and second driving elements are driven to eject a liquid from the nozzle, and a driving timing of the second driving element is earlier than a driving timing of the first driving element.

A second aspect of the present disclosure is a driving method of a liquid ejecting head. The liquid ejecting head includes a nozzle for ejecting a liquid, first and second pressure chambers communicating with the nozzle, a first driving element that changes the pressure in the first pressure chamber, and a second driving element that changes the pressure in the second pressure chamber. A first flow path length of a flow path from the first pressure chamber to the nozzle is shorter than a second flow path length of a flow path from the second pressure chamber to the nozzle. In the driving method of a liquid ejecting head, at least the first and second driving elements are driven to eject a liquid from the nozzle, and a magnitude of a pressure change of a liquid in the second pressure chamber caused by driving the second driving element is greater than a magnitude of a pressure change of a liquid in the first pressure chamber caused by driving the first driving element.

A third aspect of the present disclosure is a liquid ejecting apparatus including a liquid ejecting head and a control section that controls an ejection operation of the liquid ejecting head. In the liquid ejecting head, a nozzle for ejecting a liquid, first and second pressure chambers communicating with the nozzle, a first driving element that changes a pressure in the first pressure chamber, and a second driving element that changes a pressure in the second pressure chamber are provided, and a first flow path length of a flow path from the first pressure chamber to the nozzle is shorter than a second flow path length of a flow path from the second pressure chamber to the nozzle. In the control section, at least the first and second driving elements are driven to eject a liquid from the nozzle, and a driving timing of the second driving element is earlier than a driving timing of the first driving element.

A fourth aspect of the present disclosure is a liquid ejecting apparatus including a liquid ejecting head and a control section that controls an ejection operation of the liquid ejecting head. In the liquid ejecting head, a nozzle for ejecting a liquid, first and second pressure chambers communicating with the nozzle, a first driving element that changes a pressure in the first pressure chamber, and a second driving element that changes a pressure in the second pressure chamber are provided, and a first flow path length of a flow path from the first pressure chamber to the nozzle is shorter than a second flow path length of a flow path from the second pressure chamber to the nozzle. In the control section, at least the first and second driving elements are driven to eject a liquid from the nozzle, and a magnitude of a pressure change of a liquid in the second pressure chamber caused by driving the second driving element is greater than a magnitude of a pressure change of a liquid in the first pressure chamber caused by driving the first driving element.

DESCRIPTION OF EXEMPLARY EMBODIMENTS

A. Configuration of First Embodiment

Figure 1:
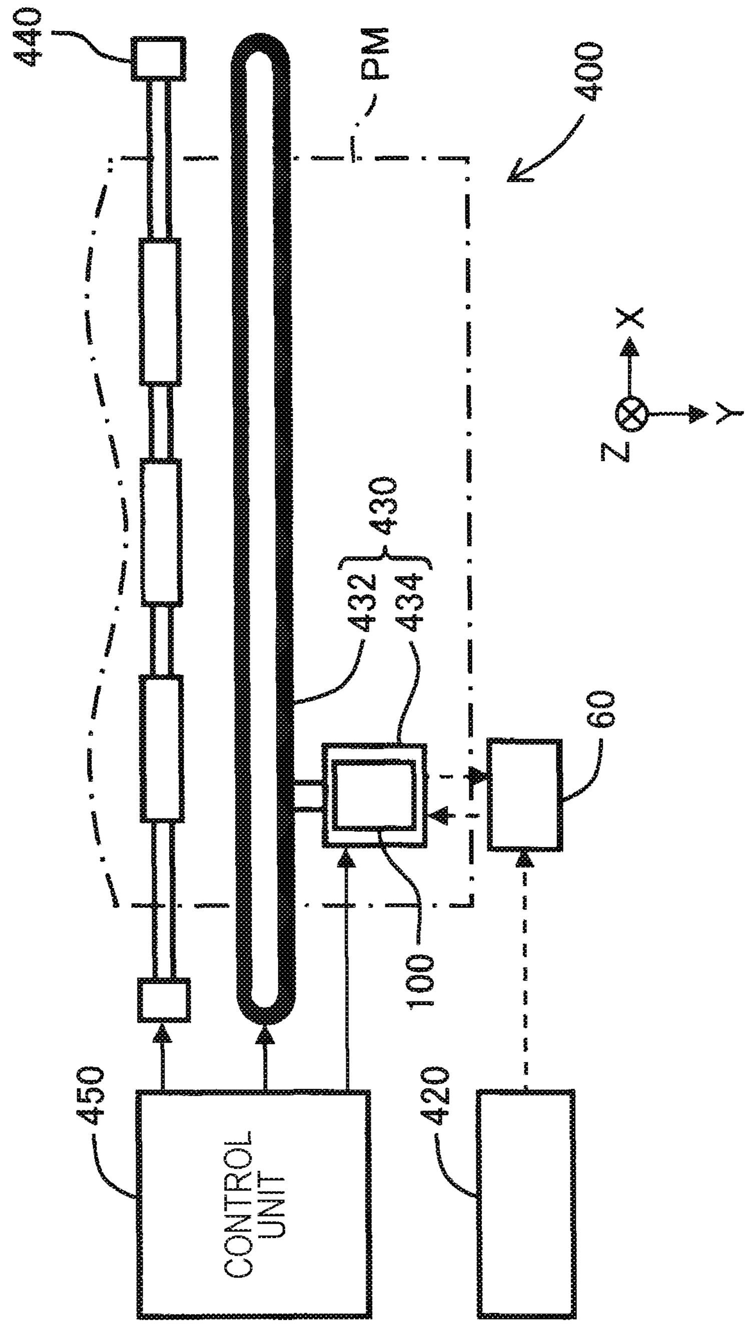
FIG. 1 is an explanatory diagram illustrating a configuration of a liquid ejecting apparatus according to an embodiment.

FIG. 1 is an explanatory diagram illustrating a configuration of a liquid ejecting apparatus 400 according to an embodiment. The liquid ejecting apparatus 400 is an ink jet type printing apparatus that ejects ink, which is an example of a liquid, onto a medium PM. The composition of the ink is not particularly limited. For example, the ink may be a water-based ink in which a coloring material such as a dye or pigment is dissolved in a water-based solvent, a solvent-based ink in which a coloring material is dissolved in an organic solvent, or an ultraviolet curable type ink. In addition, the liquid ejecting apparatus 400 may eject paint as a liquid instead of ink. A liquid storage section 420 for storing ink can be attached to the liquid ejecting apparatus 400. The liquid ejecting apparatus 400 executes printing by ejecting the ink in the liquid storage section 420 toward the medium PM. The liquid ejecting apparatus 400 includes a liquid ejecting head 100, a moving mechanism 430, a transport mechanism 440, a control section 450, and a circulation mechanism 60.

The liquid ejecting head 100 includes a plurality of nozzles 200 and ejects liquid ink supplied from the liquid storage section 420 from the plurality of nozzles 200. Specific examples of the liquid storage section 420 include a container such as a cartridge that is attachable to and detachable from the liquid ejecting apparatus 400, a bag-shaped ink pack formed of a flexible film, and an ink tank that can be refilled with ink. Ink ejected from the nozzle 200 lands on the medium PM. The medium PM is typically a printing paper sheet. The medium PM is not limited to a printing paper sheet, and may be, for example, a printing target of any material such as a resin film or cloth.

The moving mechanism 430 includes a ring-shaped belt 432 and a carriage 434 fixed to the belt 432. The carriage 434 holds the liquid ejecting head 100. The moving mechanism 430 can reciprocate the liquid ejecting head 100 in the X direction by rotating the ring-shaped belt 432 in both directions.

The transport mechanism 440 transports the medium PM in the Y direction between movements of the liquid ejecting head 100 by the moving mechanism 430. The Y direction is a direction orthogonal to the X direction. In this embodiment, the X direction and the Y direction are horizontal directions. The Z direction is a direction intersecting the X direction and the Y direction. In this embodiment, the Z direction is vertically downward. The liquid ejecting head 100 ejects ink in the Z direction while being transported in the X direction. The Z direction is also referred to as "ejection direction Z". In the following description, the tip end side of the arrow indicating the X direction in the drawing is referred to as the +X side, and the base end side is referred to as the −X side. The tip end side of the arrow indicating the Y direction in the drawing is referred to as the +Y side, and the base end side is referred to as the −Y side. The tip end side of the arrow indicating the Z direction in the drawing is referred to as the +Z side, and the base end side is referred to as the −Z side.

The control section 450 controls the operation of ejecting ink from the liquid ejecting head 100. The control section 450 controls the transport mechanism 440, the moving mechanism 430, and the liquid ejecting head 100 to form an image on the medium PM.

Figure 2:
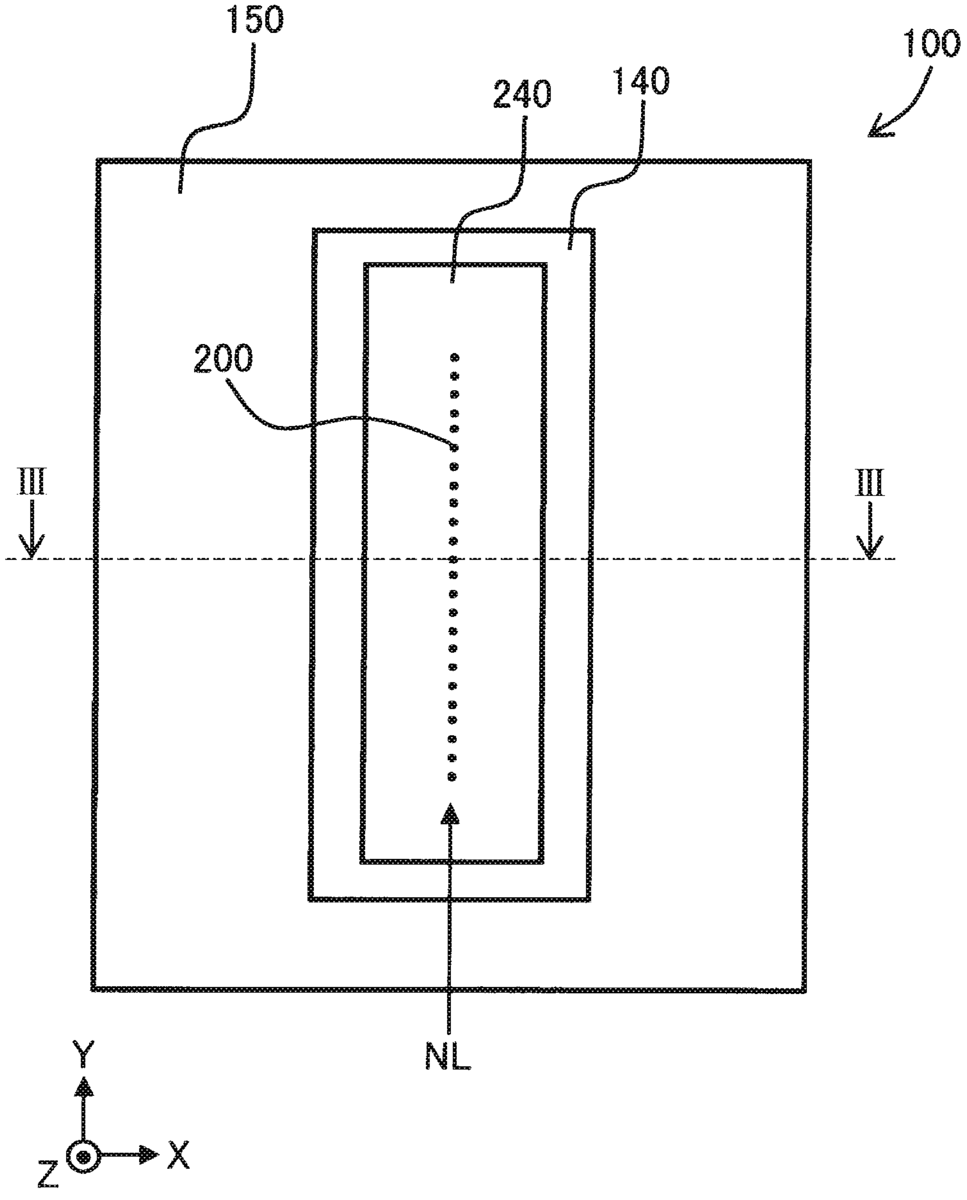
FIG. 2 is a bottom view of a liquid ejecting head.

FIG. 2 is a bottom view of the liquid ejecting head 100. The liquid ejecting head 100 includes the plurality of nozzles 200. The plurality of nozzles 200 are formed to penetrate a nozzle plate 240 disposed parallel to the XY plane. The plurality of nozzles 200 constitute a nozzle array NL by being linearly arranged in the Y direction. The nozzle plate 240 is manufactured, for example, by processing a silicon single crystal substrate using semiconductor processing technology. As the silicon single crystal substrate, for example, a (100) silicon single crystal substrate is preferably used. Note that the nozzle plate 240 may be made of a material such as stainless steel (SUS) or titanium.

Figure 3:
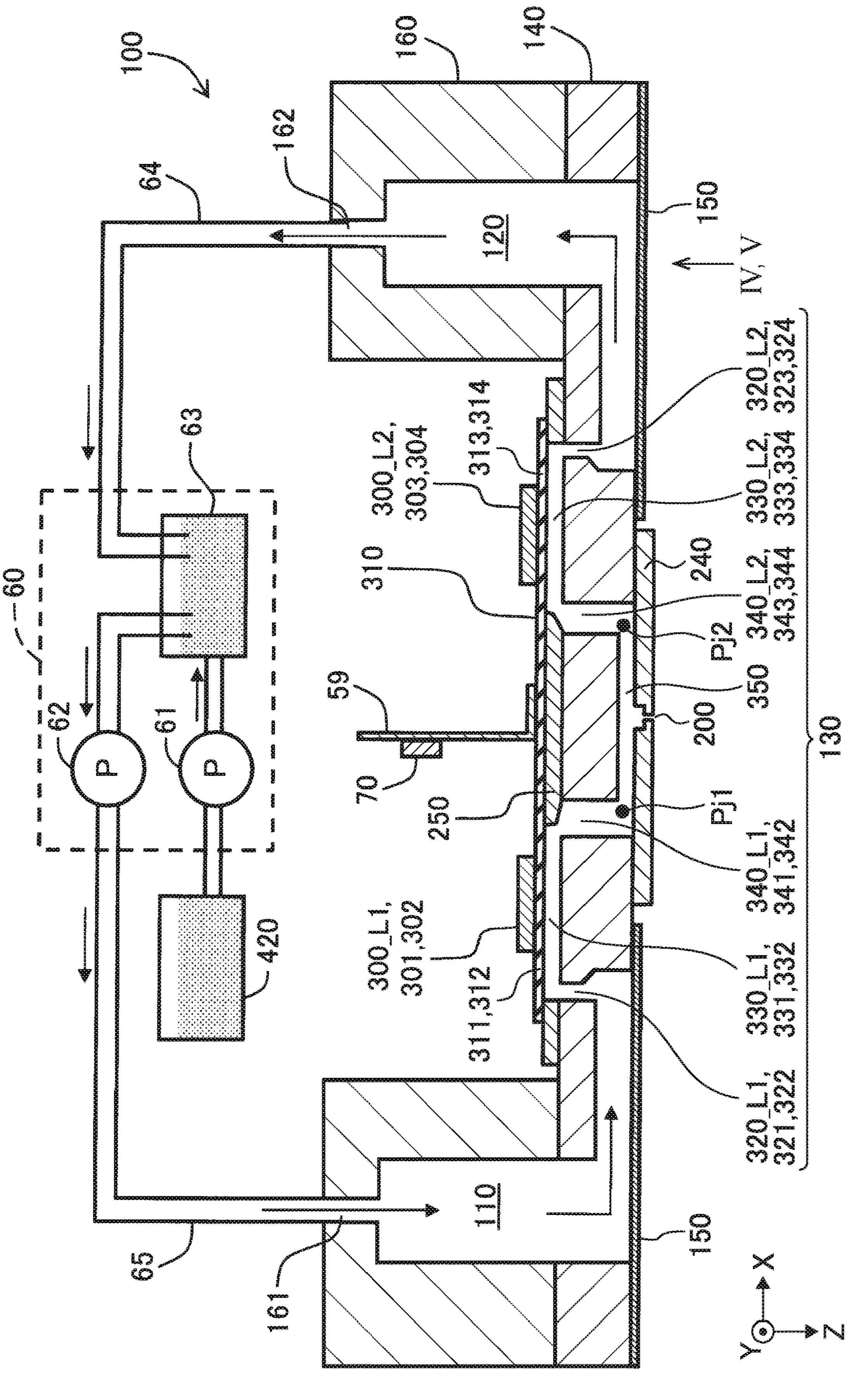
FIG. 3 is a cross-sectional view illustrating a cross section taken along the line III-III of FIG. 2.
Figure 4:
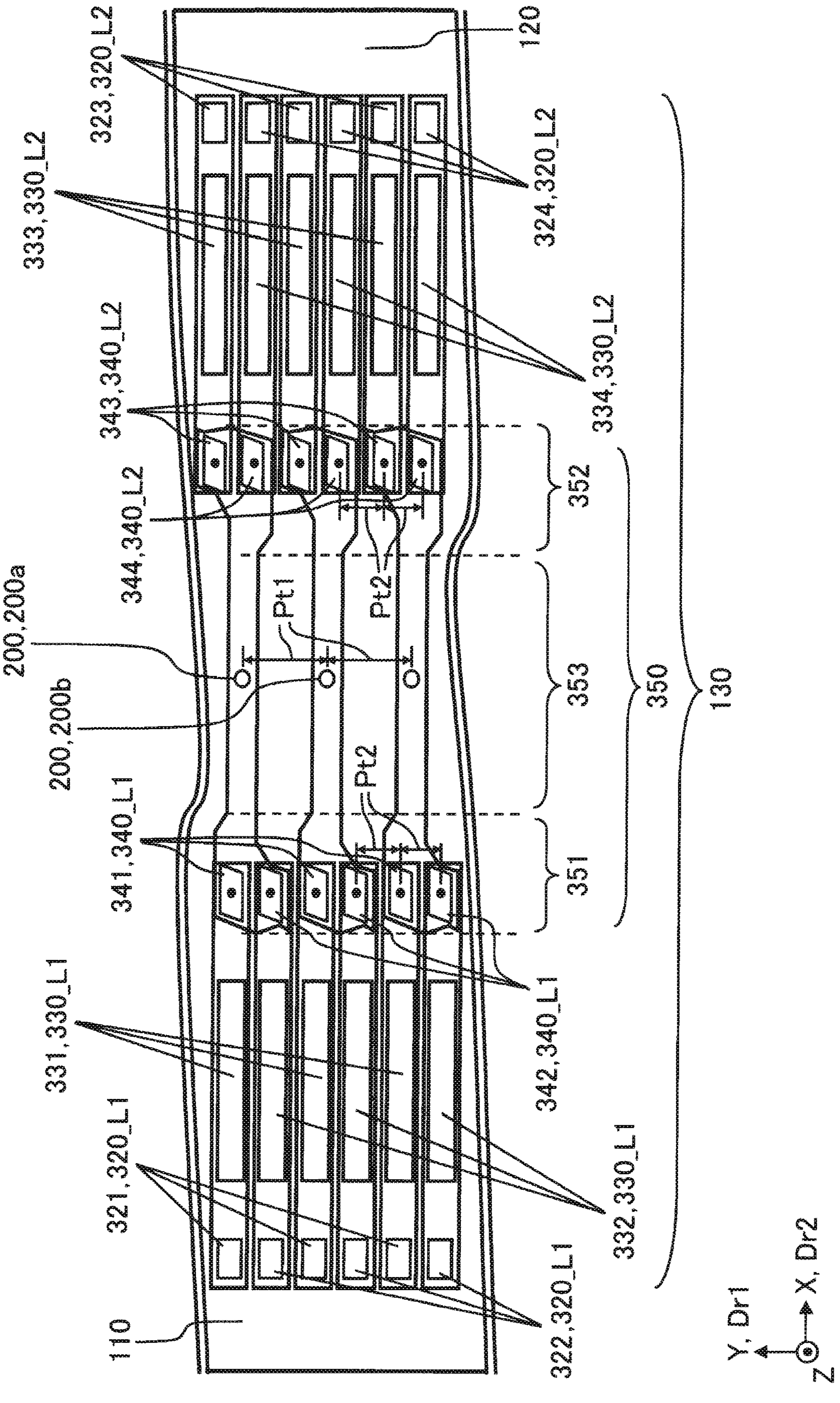
FIG. 4 is a view illustrating a part of flow paths for three nozzles and first and second common liquid chambers, viewed from the bottom of FIG. 3.
Figure 5:
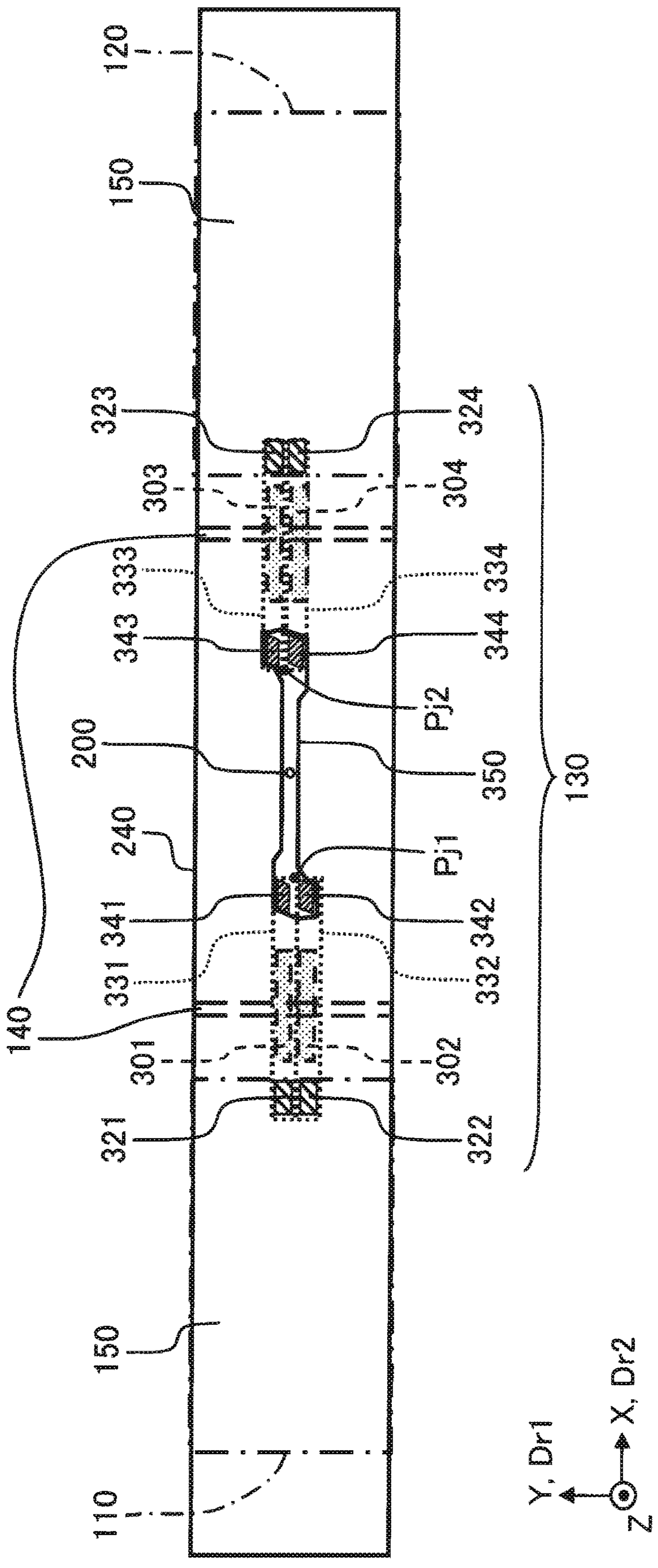
FIG. 5 is a view illustrating a part of a flow path for one nozzle viewed from the bottom of FIG. 3.
Figure 6:
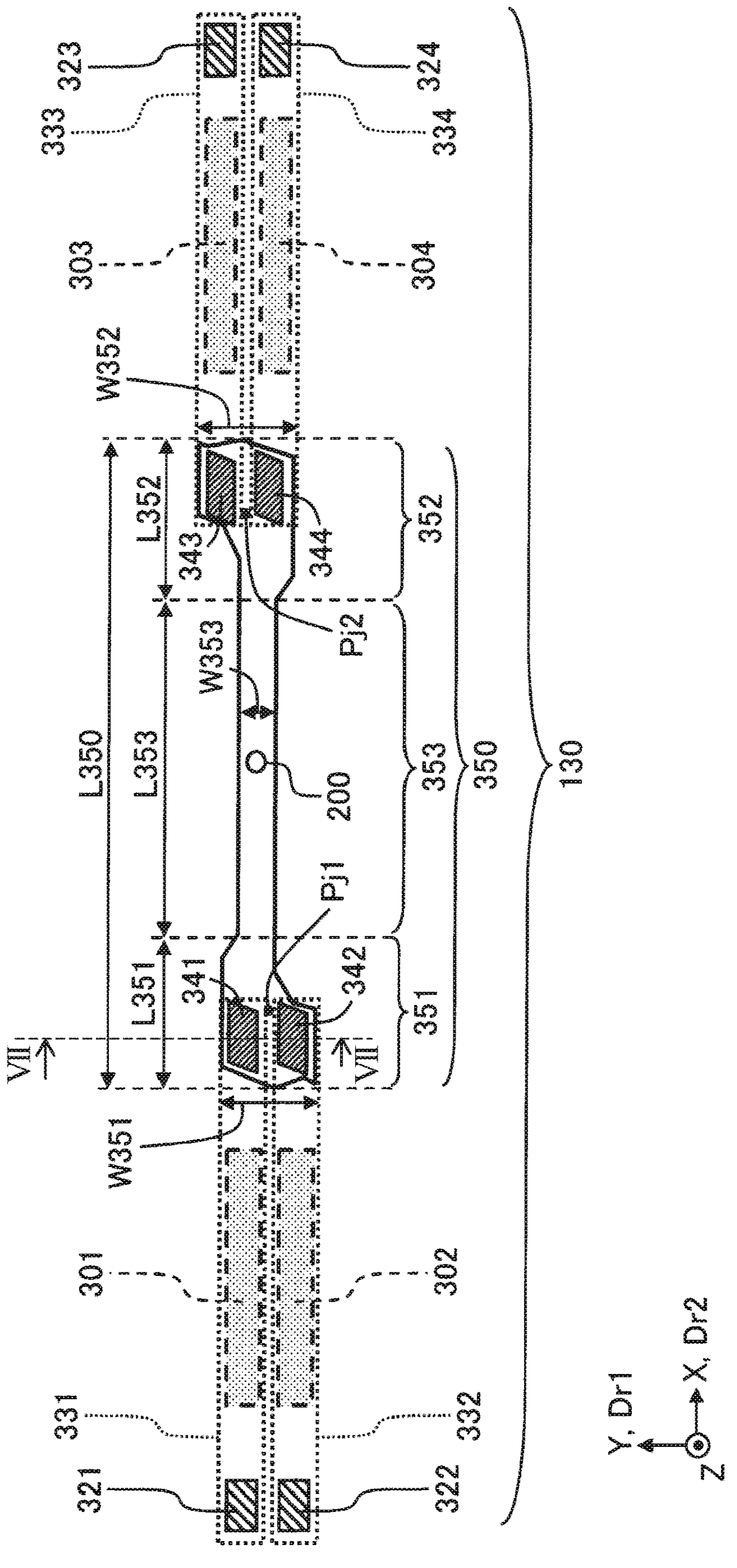
FIG. 6 is an enlarged view of the flow path of FIG. 5.
Figure 7:
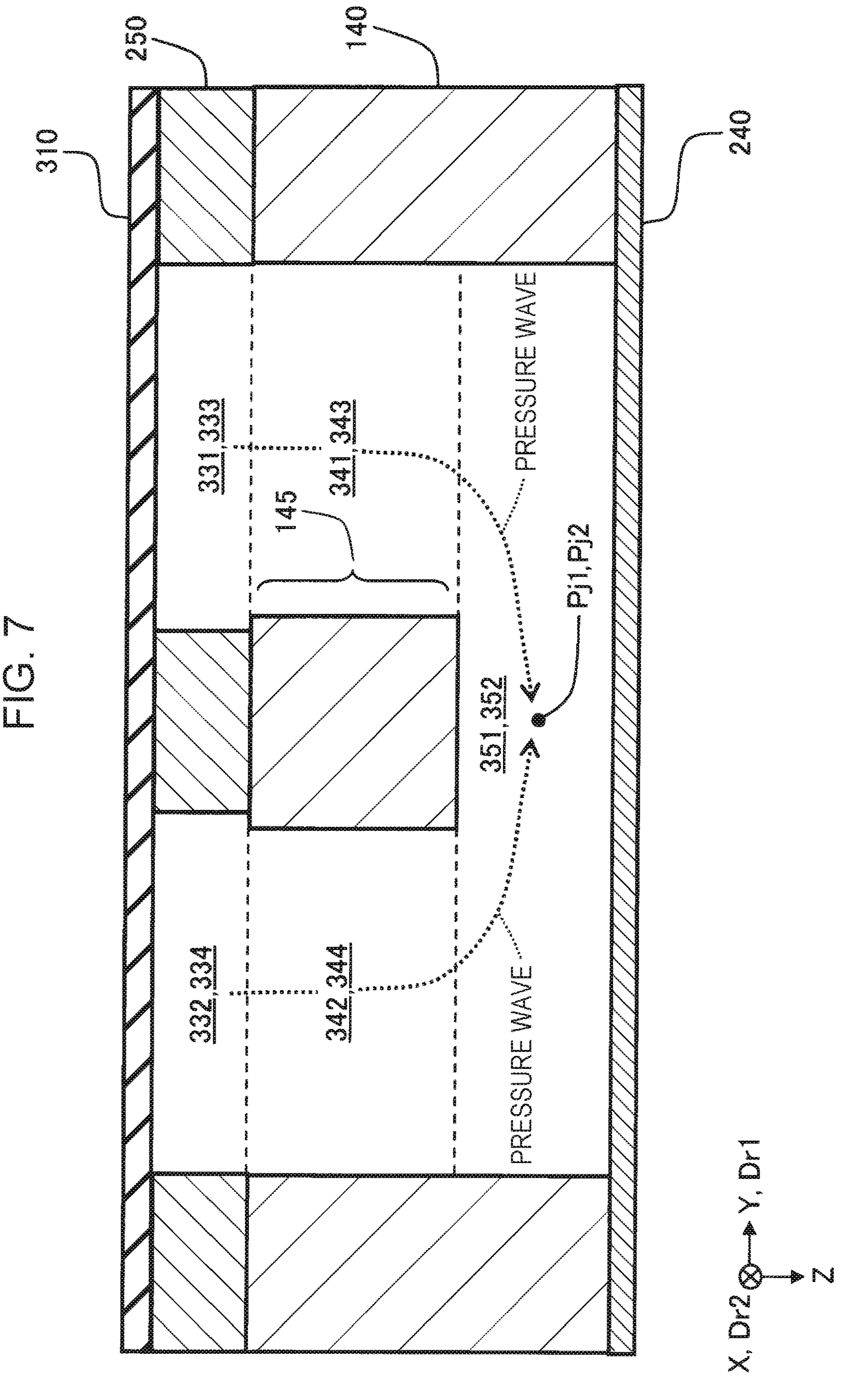
FIG. 7 is a cross-sectional view illustrating a cross section taken along the line VII-VII of FIG. 6.

FIG. 3 is a cross-sectional view illustrating a cross section taken along the line III-III of FIG. 2. FIG. 4 is a view illustrating a part of flow paths for three nozzles, a first common liquid chamber 110, and a second common liquid chamber 120, viewed from the bottom of FIG. 3. FIG. 5 is a view illustrating a part of a flow path for one nozzle and the common liquid chambers 110 and 120, viewed from the bottom of FIG. 3. FIG. 6 is an enlarged view of the flow path of FIG. 5. FIG. 7 is a cross-sectional view illustrating a cross section taken along the line VII-VII of FIG. 6. Note that FIG. 4 illustrates only the three nozzle-specific flow paths 130, the first common liquid chamber 110, and the second common liquid chamber 120. In addition, in FIGS. 5 and 6, for convenience of illustration, the communication flow path 350 is drawn with solid lines, the pressure chamber 330 is drawn with dotted lines, the driving element 300 is drawn with dashed lines, and the common liquid chambers 110 and 120 are drawn with dot dash lines. Further, in FIG. 7, after the reference numerals of each part in the cross section at positions of the pressure chambers 331 and 332, the reference numerals of each part in the cross section taken along the line VII-VII of FIG. 6 at positions of other pressure chambers 333 and 334 are illustrated in parentheses.

As illustrated in FIG. 4, an interval Pt1 between adjacent nozzles 200, that is, the distance between the centers of the nozzles 200 in the Y direction is constant. Further, an interval Pt2 between adjacent pressure chambers 330_L1 among the plurality of pressure chambers 330_L1 constituting a row L1, that is, the distance between the centers of the pressure chambers 330_L1 in the Y direction is constant. A row L2 has a similar relationship. Furthermore, the interval Pt2 in the row L1 and the interval Pt2 in the row L2 are the same, with the interval Pt2 being half the interval Pt1. In addition, the interval Pt2 between the pressure chambers 330 is the same as the interval between the communication holes 340, and is also the same as the interval between the centers of the nozzles 200 in the Y direction.

As illustrated in FIG. 3, the liquid ejecting head 100 includes a first common liquid chamber 110 to which ink is supplied, a second common liquid chamber 120 to which ink is discharged, and a nozzle-specific flow path 130 that couples the first common liquid chamber 110 and the second common liquid chamber 120. The first common liquid chamber 110 and the second common liquid chamber 120 are provided commonly to the plurality of nozzles 200, and the nozzle-specific flow paths 130 are provided individually for the individual nozzles 200. Each of the common liquid chambers 110 and 120 extends in the Y direction, which is the direction along the nozzle array NL. That is, the longitudinal direction of the common liquid chambers 110 and 120 is parallel to the direction in which the plurality of nozzles 200 are arranged.

The liquid ejecting head 100 has a row L1 of the plurality of pressure chambers 330 communicating with the first common liquid chamber 110, and a row L2 of the plurality of pressure chambers 330 communicating with the second common liquid chamber 120. The row L1 is formed by arranging the plurality of pressure chambers 330 in the Y direction, and the row L2 is formed by arranging the plurality of pressure chambers 330 in the Y direction. The row L1 is arranged on the −X side with respect to the nozzle array NL, and the row L2 is arranged on the +X side with respect to the nozzle array NL. Hereinafter, the plurality of pressure chambers 330 forming the row L1 will be referred to as pressure chambers 330_L1, and the plurality of pressure chambers 330 forming the row L2 will be referred to as pressure chambers 330_L2. Regarding the driving elements 300, the coupling flow paths 320, and the communication holes 340, which will be described later in detail, the driving element 300 corresponding to the row L1 is referred to as a driving element 300_L1, the driving element 300 corresponding to the row L2 is referred to as a driving element 300_L2, a coupling flow path 320 corresponding to the row L1 is referred to as a coupling flow path 320_L1, a coupling flow path 320 corresponding to the row L2 is referred to as a coupling flow path 320_L2, a communication hole 340 corresponding to the row L1 is referred to as a communication hole 340_L1, and a communication hole 340 corresponding to the row L2 is referred to as a communication hole 340_L2.

The nozzle-specific flow paths 130 corresponding to one nozzle 200 in this embodiment include two pressure chambers 330_L1 in the row L1, two pressure chambers 330_L2 in the row L2, two coupling flow paths 320_L1 corresponding to each of the two pressure chambers 330_L1, two coupling flow paths 320_L2 corresponding to each of the two pressure chambers 330_L2, two communication holes 340_L1 corresponding to each of the two pressure chambers 330_L1, two communication holes 340_L2 corresponding to each of the two pressure chambers 330_L2, and the communication flow path 350. Here, the two pressure chambers 330_L1 in the row L1 are referred to as pressure chambers 331 and 332, the two pressure chambers 330_L2 in the row L2 are referred to as pressure chambers 333 and 334, these two coupling flow paths 320_L1 are referred to as coupling flow paths 321 and 322, these two coupling flow paths 320_L2 are referred to as coupling flow paths 323 and 324, these two communication holes 340_L1 are referred to as communication holes 341 and 342, and these two communication holes 340_L2 are referred to as communication holes 343 and 344. In addition, the four driving elements 300 corresponding to each of the pressure chambers 331 to 334 are referred to as driving elements 301 to 304.

Each of the common liquid chambers 110 and 120 can be considered to extend in the Y direction or in the direction in which the adjacent pressure chambers 331 and 332 are arranged, that is, the direction in which the row L1 of the pressure chambers 330 extends in the extending direction. In this embodiment, the direction in which the adjacent pressure chambers 331 and 332 are arranged is an example of the "first direction". In addition, the plurality of nozzle-specific flow paths 130 are arranged in the Y direction along the nozzle array NL.

The lower portions of the common liquid chambers 110 and 120 and the plurality of nozzle-specific flow paths 130 are mainly formed by a communication plate 140. The communication plate 140 may be configured by laminating a plurality of plate-shaped members. A housing section 160 and a pressure chamber substrate 250 are installed on the upper surface of the communication plate 140, that is, the surface of the communication plate 140 facing the −Z side. The pressure chamber substrate 250 is positioned inside the housing section 160 in plan view in the Z direction. A vibrating plate 310 is positioned on the upper surface of the pressure chamber substrate 250, that is, the surface of the pressure chamber substrate 250 facing the −Z side. The plurality of pressure chambers 330 are provided in the pressure chamber substrate 250. Each pressure chamber 330 is a space defined by the communication plate 140, the vibrating plate 310, and the pressure chamber substrate 250. The pressure chamber substrate 250 is manufactured, for example, by processing a silicon single crystal substrate using semiconductor processing technology. As the silicon single crystal substrate, for example, a (110) substrate, that is, a silicon single crystal substrate having a (110) surface as a main surface is preferably used.

The vibrating plate 310 is a plate-shaped member that can elastically vibrate. The vibrating plate 310 is, for example, a laminated body including a first layer made of silicon oxide ($SiO_2$) and a second layer made of zirconium oxide ($ZrO_2$). Further, another layer such as a metal oxide may be interposed between the first layer and the second layer. Further, some or all of the vibrating plates 310 may be integrally made of the same material as the pressure chamber substrate 250. For example, the vibrating plate 310 and the pressure chamber substrate 250 can be integrally formed by selectively removing a part of the thickness direction of the region corresponding to the pressure chamber 330 in a plate-shaped member having a predetermined thickness by etching or the like. Further, the vibrating plate 310 may be composed of a layer of a single material.

A nozzle plate 240 is installed on the lower surface of the communication plate 140, that is, the surface facing the +Z side of the communication plate 140, and the lower end portions of the first common liquid chamber 110 and the second common liquid chamber 120, that is, the end portions on the +Z side of the first common liquid chamber 110 and the second common liquid chamber 120 are sealed with a flexible sealing film 150 made of a resin film, a thin metal film, or the like.

A wiring substrate 59 is bonded to the surface of the vibrating plate 310 facing the −Z side. The wiring substrate 59 is a mounting component formed with a plurality of wirings for electrically coupling the control section 450 and the liquid ejecting head 100. The wiring substrate 59 is, for example, a flexible wiring substrate such as a flexible printed circuit (FPC) or a flexible flat cable (FFC). A drive circuit 70 for driving the driving element 300 is mounted on the wiring substrate 59. The drive circuit 70 supplies a driving signal to each driving element 300.

A plurality of driving elements 300 are provided corresponding to each of the pressure chambers 330 on the upper surface of the vibrating plate 310, that is, the surface of the vibrating plate 310 facing the −Z side. These driving elements 300 are composed of piezoelectric elements, for example. The piezoelectric element is composed of, for example, a piezoelectric layer and two electrodes provided to sandwich the piezoelectric layer. For example, when the driving elements 301 to 304, which are piezoelectric elements, vibrate, the vibrations are transmitted to the pressure chambers 331 to 334, respectively, and pressure waves are generated in the pressure chambers 331 to 334, respectively. Ink is ejected from nozzles 200 by the pressure generated by the driving elements 301 to 304. When ink is ejected from the nozzle 200, it is preferable that the four driving elements 301 to 304 corresponding to the nozzle 200 be driven simultaneously in the same phase. A part of the vibrating plate 310 provided with the first driving element 301 on a surface opposite to the surface defining the first pressure chamber 331 is referred to as a first vibration section 311. Similarly, each part of the vibrating plate 310 provided with the second to fourth driving elements 302 to 304 is referred to as second to fourth vibration sections 312 to 314. As the driving element, a heat generating element that heats the ink in the pressure chamber 330 may be used instead of the piezoelectric element.

The circulation mechanism 60 is coupled to the common liquid chambers 110 and 120. The circulation mechanism 60 supplies ink to the first common liquid chamber 110 and collects ink discharged from the second common liquid chamber 120 for resupply to the first common liquid chamber 110. The circulation mechanism 60 includes a first supply pump 61, a second supply pump 62, a storage container 63, a collection flow path 64, and a supply flow path 65.

The first supply pump 61 is a pump that supplies the ink stored in the liquid storage section 420 to the storage container 63. The storage container 63 is a sub tank that temporarily stores the ink supplied from the liquid storage section 420. The collection flow path 64 is interposed between the second common liquid chamber 120 and the storage container 63 and is a flow path for collecting the ink from the second common liquid chamber 120 to the storage container 63. The ink stored in the liquid storage section 420 is supplied from the first supply pump 61 to the storage container 63. Further, the ink, which is supplied from the first common liquid chamber 110 to each nozzle-specific flow path 130, but is discharged from each nozzle-specific flow path 130 to the second common liquid chamber 120 without being ejected from the nozzle 200, is supplied to the storage container 63 through the collection flow path 64. The second supply pump 62 is a pump that sends the ink stored in the storage container 63. The supply flow path 65 is interposed between the first common liquid chamber 110 and the storage container 63 and is a flow path for supplying the ink in the storage container 63 to the first common liquid chamber 110.

An opening portion 161 at the upper end of the first common liquid chamber 110, that is, the end portion on the −Z side of the first common liquid chamber 110 is coupled to the supply flow path 65 outside the liquid ejecting head 100. In other words, the opening portion 161 of this embodiment functions as an inlet for introducing the liquid from the circulation mechanism 60. An opening portion 162 at the upper end of the second common liquid chamber 120, that is, the end portion on the −Z side of the second common liquid chamber 120 is coupled to the collection flow path 64 of the circulation mechanism 60 outside the liquid ejecting head 100. In other words, the opening portion 162 of this embodiment functions as an outlet for discharging the liquid to the circulation mechanism 60.

The nozzle-specific flow path 130 has the following flow paths and spaces. In the following description, the term "coupling" is used in the sense of direct coupling. In addition, the term "communication" is used in a broad sense including not only direct coupling but also indirect coupling.

Coupling Flow Paths 321 to 324

The first coupling flow path 321 couples the first common liquid chamber 110 and the first pressure chamber 331.

The second coupling flow path 322 couples the first common liquid chamber 110 and the second pressure chamber 332.

The third coupling flow path 323 couples the second common liquid chamber 120 and the third pressure chamber 333.

The fourth coupling flow path 324 couples the second common liquid chamber 120 and the fourth pressure chamber 334.

All of the coupling flow paths 321 to 324 are flow paths extending in the Z direction and penetrate the communication plate 140. In FIGS. 5 and 6, the coupling flow paths 321 to 324 are hatched for convenience of illustration. A part where the coupling flow path 320 and the pressure chamber 330 intersect can be regarded as a part of the pressure chamber 330.

Pressure Chambers 331 to 334

The first pressure chamber 331 to the fourth pressure chamber 334 are spaces that receive pressure changes by the first driving element 301 to the fourth driving element 304, respectively. The first pressure chamber 331 and the second pressure chamber 332 are arranged side by side in a first direction Dr1, and the third pressure chamber 333 and the fourth pressure chamber 334 are also arranged side by side in the first direction Dr1. In this embodiment, the first direction Dr1 is parallel to the Y direction. The first pressure chamber 331 and the second pressure chamber 332, and the third pressure chamber 333 and the fourth pressure chamber 334 are arranged to be shifted in a second direction Dr2 orthogonal to the first direction Dr1. In this embodiment, the second direction Dr2 is parallel to the X direction. The pressure waves generated in the first pressure chamber 331 to the fourth pressure chamber 334 reach the nozzle 200 and eject ink from the nozzle 200. The pressure chambers 331 to 334 preferably have the same shape. In this embodiment, a plurality of pressure chambers 331 to 334 are arranged in a staggered pattern. Each of the pressure chambers 330 extends in the second direction Dr2.

Communication Holes 341 to 344

The first communication hole 341 to the fourth communication hole 344 are flow paths respectively extending in the Z direction and coupling the communication flow path 350 and each of the first pressure chamber 331 to the fourth pressure chamber 334. That is, each of the pressure chambers 330 has one end coupled to the coupling flow path 320 and the other end coupled to the communication hole 340. The first communication hole 341 to the fourth communication hole 344 are examples of the "first flow path" to the "fourth flow path", respectively. In addition, in FIGS. 5 and 6, the communication holes 341 to 344 are hatched for convenience of illustration. The first communication hole 341 and the second communication hole 342 are arranged side by side in the first direction Dr1, and the third communication hole 343 and the fourth communication hole 344 are also arranged side by side in the first direction Dr1. In FIG. 7, the first communication hole 341 and the second communication hole 342 are partitioned by a communication hole partition wall 145. The communication holes 341 to 344 are flow paths extending in the same direction as the coupling flow paths 321 to 324 and penetrate the communication plate 140. The communication holes 341 to 344 preferably have the same shape. A part where the communication hole 340 and the pressure chamber 330 intersect can be regarded as a part of the pressure chamber 330.

Communication Flow Path 350

As illustrated in FIG. 3, the communication flow path 350 is a flow path that is coupled to the nozzle 200 and communicates between the nozzle 200 and the first pressure chamber 331 to the fourth pressure chamber 334. In addition, the communication flow path 350 is a flow path extending along the nozzle surface of the nozzle plate 240 on which the plurality of nozzles 200 are formed, and the nozzles 200 are provided in the middle of the communication flow path 350. Specifically, the communication flow path 350 extends in the X direction and is defined by the communication plate 140 and the surface of the nozzle plate 240 facing the −Z side. As illustrated in FIG. 6, the communication flow path 350 includes a first part 351, a second part 352, and a third part 353. The first part 351 of the communication flow path 350 is disposed at one end of the communication flow path 350 and coupled to the first communication hole 341 and the second communication hole 342. The second part 352 of the communication flow path 350 is disposed at the other end of the communication flow path 350 and coupled to the third communication hole 343 and the fourth communication hole 344. The third part 353 of the communication flow path 350 is coupled between the first part 351 and the second part 352. Note that the third part 353 is a part narrower than the width of the first part 351 or the second part 352 in the first direction Dr1. Further, in this embodiment, a width W353 of the third part 353 in the first direction Dr1 is constant. A part where the first to fourth communication holes 341 to 344 and the communication flow path 350 intersect can be regarded as a part of the communication flow path 350.

The pressure waves generated in the first pressure chamber 331 and the second pressure chamber 332 are joined at the lower end portions of the first communication hole 341 and the second communication hole 342, that is, a first joining position Pj1 near the end portions on the +Z side of the first communication hole 341 and the second communication hole 342. The pressure waves generated in the third pressure chamber 333 and the fourth pressure chamber 334 are joined at the lower end portions of the third communication hole 343 and the fourth communication hole 344, that is, a second joining position Pj2 near the end portions on the +Z side of the third communication hole 343 and the fourth communication hole 344. These pressure waves act as a driving force for ejecting ink from the nozzles 200.

As the ink, for example, a liquid having pseudoplasticity can be used. More specifically, it is preferable that the ink have a viscosity of 0.01 Pa·s or more and 0.2 Pa·s or less at a shear rate of 1000 $s^{-1}$ at 25° C., and a viscosity of 0.5 Pa·s or more and 50 Pa·s or less at a shear rate of 0.01 $s^{-1}$. In this embodiment, the four pressure chambers 331 to 334 are used to reduce the cross-sectional area of each flow path, increase the flow speed, and reduce the viscosity of the ink, thereby making it possible to use liquid ink having pseudoplasticity. However, from the pressure chambers 331 to 334 to the nozzle 200, it is desirable to efficiently use the energy of the driving elements 301 to 304, and thus it is not preferable to excessively increase the flow path resistance. Therefore, in this embodiment, as illustrated in FIG. 5, the individual flow paths from the adjacent pressure chambers 330 to the nozzle 200 are joined earlier at the joining positions Pj1 and Pj2 closer to the pressure chamber than to the nozzle 200. Accordingly, the flow path resistance is prevented from becoming excessively large.

In this embodiment, four pressure chambers 331 to 334 are provided for one nozzle 200, but five or more pressure chambers may be provided. In either case, driving elements are provided to correspond to individual pressure chambers.

The nozzle-specific flow path 130 of this embodiment can be considered to include four individual flow paths corresponding to the four driving elements 301 to 304. An "individual flow path" is a flow path including at least the pressure chamber 330, and one individual flow path corresponds to one driving element 300. In this embodiment, the first individual flow path can be considered to include the first coupling flow path 321, the first pressure chamber 331, and the first communication hole 341. The second to fourth individual flow paths can also be grasped in the same manner.

The liquid ejecting head 100 of the first embodiment further has the following features related to attenuation of pressure waves.

Feature F1

As illustrated in FIG. 6, the first joining position Pj1 is closer to the end portion of the pressure chambers 331 and 332 on the nozzle 200 side than to the nozzle 200 in plan view in the Z direction. That is, the distance from the first joining position Pj1 to each end portion of the pressure chambers 331 and 332 on the nozzle 200 side is shorter than the distance from the first joining position Pj1 to the nozzle 200. Here, the "first end portion of the pressure chamber 331 on the nozzle 200 side" means the end portion opposite to the first common liquid chamber 110, that is, the end portion on the +X side, of both end portions of the pressure chamber 331 in the X direction. The "second end portion of the pressure chamber 332 on the nozzle 200 side" means the end portion opposite to the first common liquid chamber 110, that is, the end portion on the +X side, of both end portions of the pressure chamber 332 in the X direction. Similarly, the second joining position Pj2 is closer to the end portions of the pressure chambers 333 and 334 than to the nozzle 200 in plan view in the Z direction. The "third end portion of the pressure chamber 333 on the nozzle 200 side" means the end portion opposite to the second common liquid chamber 120, that is, the end portion on the −X side, of both end portions of the pressure chamber 333 in the X direction. The "fourth end portion of the pressure chamber 334 on the nozzle 200 side" means the end portion opposite to the second common liquid chamber 120, that is, the end portion on the −X side, of both end portions of the pressure chamber 334 in the X direction.

According to this feature F1, the pressure wave from the first pressure chamber 331 and the pressure wave from the second pressure chamber 332 are combined not in the vicinity of the nozzle 200 but in the vicinity of the pressure chambers 331 and 332. Therefore, compared to the example of the related art in which the pressure wave from the first pressure chamber 331 and the pressure wave from the second pressure chamber 332 are combined in the vicinity of the nozzle 200, excessive attenuation of pressure waves directed from the individual pressure chambers 330 to the nozzles 200 can be prevented. The same applies to the third pressure chamber 333 and the fourth pressure chamber 334 as well.

Moreover, according to the feature F1, compared to the example of the related art, the ratio of the part common to the pressure chambers 331 and 332 in the flow path from each end portion of the pressure chambers 331 and 332 to the nozzle 200 can be increased. Therefore, compared to the example of the related art, the flow path resistance from the pressure chambers 331 and 332 to the nozzle 200 can be reduced. The same applies to the third pressure chamber 333 and the fourth pressure chamber 334 as well. As a result, the pressure loss can be reduced and ejection efficiency can be improved. In particular, when using high-viscosity ink such as pseudoplastic ink, the effect of improving ejection efficiency is remarkable. On the other hand, as in the example of the related art, in the configuration in which the pressure waves join in the vicinity of the nozzle 200, the pressure waves are greatly attenuated and the ejection efficiency is lowered. In addition, there is a concern that it will be difficult to refill the nozzles 200 with ink, or that air bubbles will be caught in the nozzles.

In addition, the first joining position Pj1 can also be considered as the joining position of the flow path from the first pressure chamber 331 to the nozzle 200 and the flow path from the second pressure chamber 332 to the nozzle 200. Similarly, the second joining position Pj2 can also be considered as the joining position of the flow path from the third pressure chamber 333 to the nozzle 200 and the flow path from the fourth pressure chamber 334 to the nozzle 200. As described above, in practice, the liquid is supplied from the outside to the first common liquid chamber 110, and guided from the first common liquid chamber 110 to the first pressure chamber 331 and the second pressure chamber 332. After this, a part of the liquid is ejected from the nozzle 200 in the communication flow path 350, guided to the second common liquid chamber 120 via the third pressure chamber 333 and the fourth pressure chamber 334, and discharged from the second common liquid chamber 120 to the outside. Therefore, both the "flow path from the third pressure chamber 333 to the nozzle 200" and the "flow path from the fourth pressure chamber 334 to the nozzle 200" are assumed to flow in the opposite orientation to the actual liquid flow. However, it can be understood that these flow paths can be assumed regardless of the orientation of the liquid.

Feature F2

As illustrated in FIG. 6, in plan view in the Z direction, the first joining position Pj1 is between the first pressure chamber 331 and the second pressure chamber 332, and the second joining position Pj2 is between the third pressure chamber 333 and the fourth pressure chamber 334.

Feature F3

As illustrated in FIG. 6, the communication flow path 350 has the first joining position Pj1 at one end portion and the second joining position Pj2 at the other end portion. According to this feature F3, the pressure waves from the pressure chambers 331 and 332 join near their sources, the pressure waves from the pressure chambers 333 and 334 join near their sources, and thus attenuation of pressure waves can be suppressed more efficiently.

Feature F4

As illustrated in FIGS. 6 and 7, the first joining position Pj1 is positioned at the first part 351 of the communication flow path 350, and the second joining position Pj2 is positioned at the second part 352 of the communication flow path 350. According to this feature F4, as illustrated in FIG. 7, the communication hole partition walls 145 exist between the communication holes 341 and 342 adjacent to each other and between the communication holes 343 and 344, respectively, and thus crosstalk between the pressure chambers 331 and 332 and crosstalk between the pressure chambers 333 and 334 can be reduced.

Feature F5

As illustrated in FIG. 6, a dimension L353 of the third part 353 of the communication flow path 350 measured in the second direction Dr2 is longer than a dimension L351 of the first part 351. In addition, a dimension L353 of the third part 353 is longer than a dimension L352 of the second part 352.

Feature F6

As illustrated in FIG. 6, the third part 353 of the communication flow path 350 is coupled to the nozzle 200. According to this feature F6, the pressure waves from the pressure chambers 331 to 334 join near their sources, and thus attenuation of pressure waves can be suppressed more efficiently.

Feature F7

As illustrated in FIG. 6, a width W353 of the third part 353 of the communication flow path 350 measured in the first direction Dr1 is less than a width W351 of the first part 351. In addition, the width W353 of the third part 353 is less than the width W352 of the second part 352. According to this feature F7, when using a liquid having pseudoplasticity, the width W353 of the third part 353 is reduced, and accordingly, it is possible to increase the flow speed in the vicinity of the nozzle 200 and reduce the viscosity of the ink in the vicinity of the nozzle 200.

Feature F8

As illustrated in FIG. 3, each of the first communication hole 341 to the fourth communication hole 344 extends in a direction intersecting the extending direction of the communication flow path 350. That is, the longitudinal direction of each of the first communication hole 341 to the fourth communication hole 344 is the direction intersecting the longitudinal direction of the communication flow path 350. In this embodiment, the X direction is an example of the "extending direction of the communication flow path 350", and the Z direction is an example of the "direction intersecting the extending direction of the communication flow path 350".

It is also possible to consider that the first communication hole 341 to the fourth communication hole 344 extend in a direction intersecting the direction in which the pressure chambers 330 adjacent to each other are arranged. In addition, as can be seen from FIG. 3, it is also possible to consider that the first communication hole 341 to the fourth communication hole 344 extend in the direction perpendicular to the front surface of the nozzle plate 240. Furthermore, it is also possible to consider that the first communication hole 341 to the fourth communication hole 344 extend in the ejection direction Z.

Feature F9

As illustrated in FIG. 3, each of the communication holes 341 to 344 is closer to the nozzle 200 than is the coupling flow paths 321 to 324 in plan view in the Z direction. In other words, each distance from each of the communication holes 341 to 344 to the coupling flow paths 321 to 324 is shorter than each distance from each of the communication holes 341 to 344 to the nozzle 200. According to this feature F9, the communication flow path 350 can be shortened, and the flow path resistance can be reduced.

The liquid ejecting head 100 of the first embodiment has at least some of the features F1 to F9 described above, and thus the pressure waves can be combined on the pressure chambers 331 to 334 side instead of on the nozzle 200 side, and excessive attenuation of pressure waves directed from the individual pressure chambers 330 to the nozzles 200 can be prevented. In addition, some or all of the above-described features may be omitted. Further, the liquid ejecting head 100 having a configuration other than the above-described configuration may be used.

Figure 8:
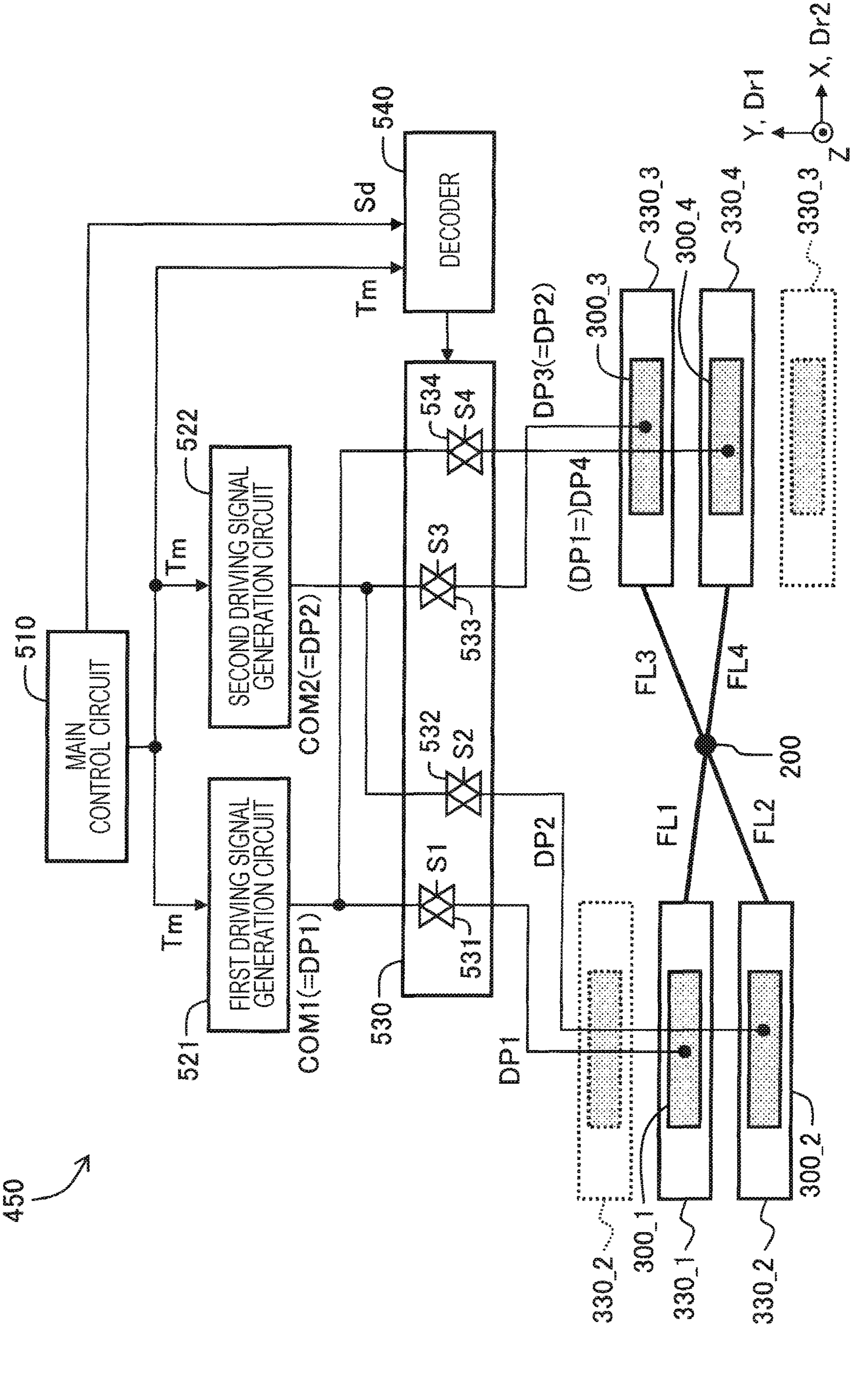
FIG. 8 is an explanatory diagram illustrating a head drive function of a control section according to a first embodiment.

B. Configuration and Driving Method of Control Section According to First Embodiment FIG. 8 is an explanatory diagram illustrating a head drive function of the control section 450 according to the first embodiment. A circuit part related to driving the liquid ejecting head 100 is drawn at the upper portion of FIG. 8, and a plurality of pressure chambers 330_1 to 330_4, the nozzle 200, and flow path lengths FL1 to FL4 from the pressure chambers 330_1 to 330_4 to the nozzle 200 are drawn at the lower portion of FIG. 8.

The plurality of pressure chambers 330_1 to 330_4 correspond to the pressure chambers 331 to 334 illustrated in FIGS. 3 to 6. Further, the driving elements 300_1 to 300_4 drawn in the pressure chambers 330_1 to 330_4 correspond to the driving elements 301 to 304 illustrated in FIGS. 3 to 6. In plan view in the Z direction, the first pressure chamber 330_1 and the second pressure chamber 330_2 are arranged on the −X side, which is one side with respect to the nozzle 200, and the third pressure chamber 330_3 and the fourth pressure chamber 330_4 are arranged on the +X side, which is the other side with respect to the nozzle 200. The second pressure chamber 330_2 and the third pressure chamber 330_3 indicated by the dotted line are pressure chambers for other nozzles adjacent to each other.

The plurality of pressure chambers 330_1 to 330_4 are arranged in a staggered pattern. That is, the pressure chambers 330_1 and 330_2 arranged on one side with respect to the nozzle 200 and the pressure chambers 330_3 and 330_4 arranged on the other side are arranged to be shifted in the second direction Dr2 intersecting the first direction Dr1. Further, with respect to the position in the first direction Dr1, the first pressure chamber 330_1 is disposed between the third pressure chamber 330_3 and the fourth pressure chamber 330_4, and the fourth pressure chamber 330_4 is disposed between the first pressure chamber 330_1 and the second pressure chamber 330_2. In other words, the center of the first pressure chamber 330_1 in the first direction Dr1 is disposed between the center of the third pressure chamber 330_3 and the center of the fourth pressure chamber 330_4, and the center of the fourth pressure chamber 330_4 is disposed between the center of the first pressure chamber 330_1 and the center of the second pressure chamber 330_2.

The mutual positional relationship of the pressure chambers 330_1 to 330_4 in FIG. 8 indicates the positional relationship in plan view in the Z direction, but the flow path lengths FL1 to FL4 indicate not accurate lengths but only the length relationship described below. As illustrated in FIGS. 3 to 6, the flow paths from each of the pressure chambers 330 to the nozzle 200 have a three-dimensionally bent configuration, and the flow path lengths FL1 to FL4 illustrated in FIG. 8 are the lengths measured to follow those three-dimensional flow paths. However, the flow path from each of the pressure chambers 330 to the nozzle 200 does not need to be bent three-dimensionally, and may be configured two-dimensionally.

The flow path lengths FL1 to FL4 have the following relationship.

$$FL1<FL2 \quad (1a)$$

$$FL4<FL3 \quad (1b)$$

$$FL1=FL4 \quad (1c)$$

$$FL2=FL3 \quad (1d)$$

That is, the first flow path length FL1 of the flow path from the first pressure chamber 330_1 to the nozzle 200 is shorter than the second flow path length FL2 of the flow path from the second pressure chamber 330_2 to the nozzle 200. Further, the fourth flow path length FL4 of the flow path from the fourth pressure chamber 330_4 to the nozzle 200 is shorter than the third flow path length FL3 of the flow path from the third pressure chamber 330_3 to the nozzle 200.

These flow path lengths FL1 to FL4 are the lengths of the flow paths from the end portions of the pressure chambers 330_1 to 330_4 to the nozzle 200, but instead, the length of the flow path from the centers of the driving elements 300_1 to 300_4 to the nozzle 200 may be used as the flow path lengths FL1 to FL4. Also in this case, it is preferable that the above formulas (1a) to (1d) are satisfied.

In addition, the above formula (1c) and formula (1d) may not be satisfied. In this case, it is preferable to add a third driving signal generation circuit for generating a third driving pulse DP3 and a fourth driving signal generation circuit for generating a fourth driving pulse DP4.

The control section 450 includes a main control circuit 510, a first driving signal generation circuit 521, a second driving signal generation circuit 522, a switch circuit 530, and a decoder 540. The main control circuit 510 has a function of controlling other circuits in the control section 450. The first driving signal generation circuit 521, the second driving signal generation circuit 522, the switch circuit 530, and the decoder 540 operate in synchronization with a timing signal Tm periodically given from the main control circuit 510 and a clock signal (not illustrated). The main control circuit 510 further supplies the dot size signal Sd to the decoder 540. The dot size signal Sd is a signal representing the size of dots formed on the medium PM by ejecting the liquid, and is generated for each dot position. In addition, the main control circuit 510, the first driving signal generation circuit 521, and the second driving signal generation circuit 522 are shared for controlling the plurality of nozzles 200. Further, the switch circuit 530 and the decoder 540 are provided corresponding to the individual nozzles 200. However, the first driving signal generation circuit 521 and the second driving signal generation circuit 522 may be provided individually corresponding to the individual nozzles 200. It is preferable that some circuits of the control section 450 be mounted on the carriage 434 on which the liquid ejecting head 100 is mounted. Further, some circuits of the control section 450 may be a part of the liquid ejecting head 100, and it is particularly preferable that the switch circuit 530 be included in the drive circuit 70.

The first driving signal generation circuit 521 and the second driving signal generation circuit 522 generate a first common driving signal COM1 and a second common driving signal COM2 to be given to the driving element 300, respectively, and supply the signals to the switch circuit 530. The first common driving signal COM1 includes a first driving pulse DP1, and the second common driving signal COM2 includes a second driving pulse DP2. Examples of the driving pulses DP1 and DP2 will be described later. The switch circuit 530 has analog switches 531 to 534 corresponding to a plurality of driving elements 300_1 to 300_4. In this embodiment, the first common driving signal COM1 is supplied to the input terminals of the two analog switches 531 and 534, and the second common driving signal COM2 is supplied to the input terminals of the other two analog switches 532 and 533.

The decoder 540 decodes the dot size signal Sd given from the main control circuit 510 to generate the control signals S1 to S4 that realize the dot size represented by the dot size signal Sd. These control signals S1 to S4 are binary signals and are given to the control terminals of the analog switches 531 to 534, respectively. The analog switches 531 to 534 supply or stop the driving pulses DP1 and DP2 to the driving elements 300_1 to 300_4 by turning on or off in response to the control signals S1 to S4. In addition, the third driving pulse DP3 supplied to the third driving element 300_3 is the same as the second driving pulse DP2 supplied to the second driving element 300_2. Further, the fourth driving pulse DP4 supplied to the fourth driving element 300_4 is the same as the first driving pulse DP1 supplied to the first driving element 300_1. A third driving signal generation circuit that generates a third common driving signal including the third driving pulse DP3 and a fourth driving signal generation circuit that generates a fourth common driving signal including the fourth driving pulse DP4 may be provided.

In addition, a signal having a waveform that does not directly contribute to ejection may be applied to the driving element 300 that is not driven. The "waveform that does not directly contribute to ejection" means a small waveform such that the liquid is not ejected from the nozzle 200 even when the waveform is applied to all of the driving elements 300 corresponding to the nozzle 200. Such a waveform may be a micro-vibration waveform that is continuously applied during the non-ejection period, and may be a dedicated waveform applied to the driving element 300 which is not used for ejection in accordance with the driving timing of the driving element 300 used for ejection in order to reduce a reverse flow of liquid to the pressure chamber 330 not used for ejection. In the present disclosure, the term "driving pulse" means a signal including a waveform that directly contributes to ejection, not a signal that includes only a waveform that does not directly contribute to ejection.

Figure 9:
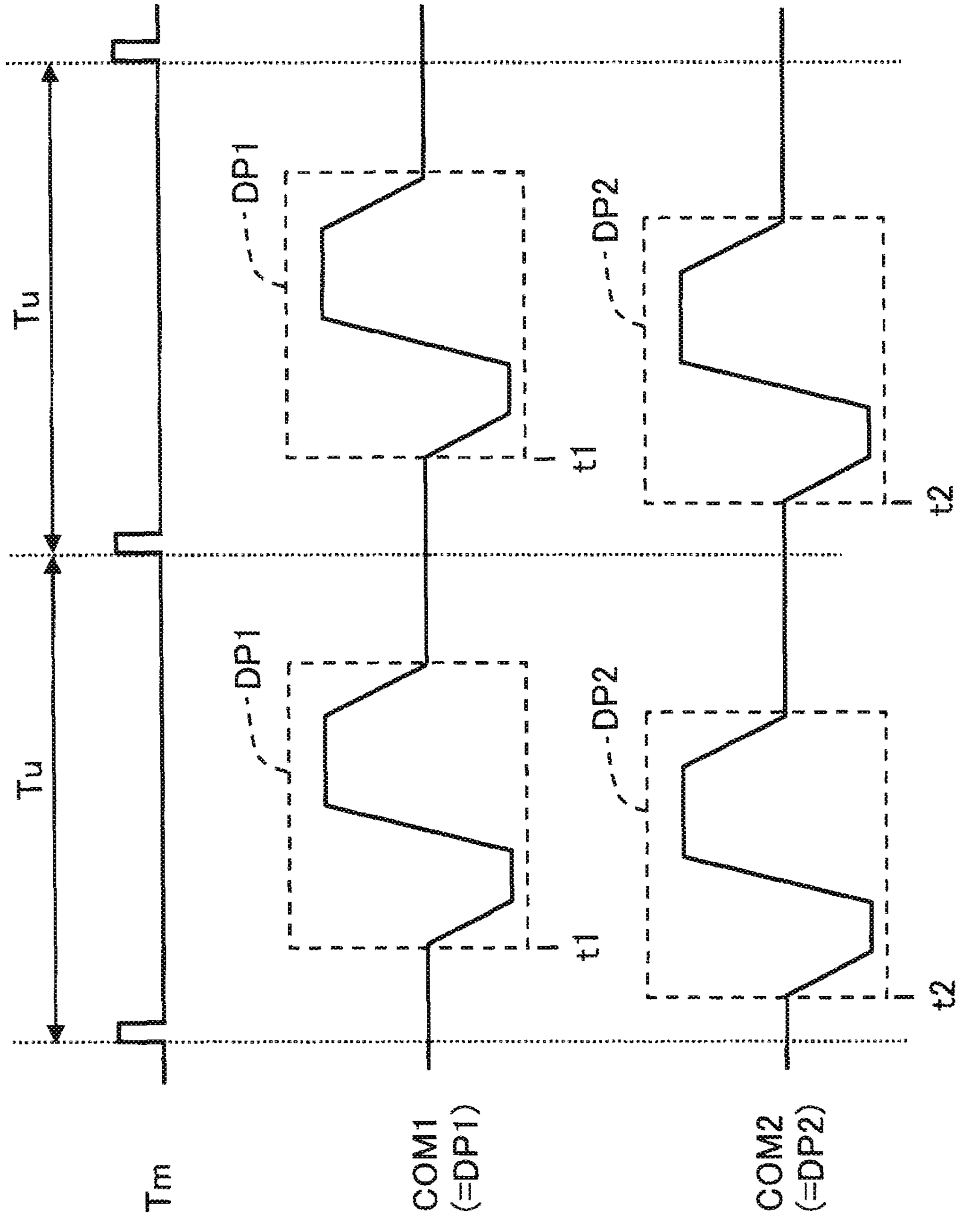
FIG. 9 is a timing chart illustrating a relationship between a common driving signal and a driving pulse.

FIG. 9 is a timing chart illustrating the relationship between the common driving signals COM1 and COM2 and the driving pulses DP1 and DP2. The first common driving signal COM1 is a signal in which the first driving pulse DP1 is periodically generated for each constant unit period Tu (control period) in synchronization with the timing signal Tm. Similarly, the second common driving signal COM2 is a signal in which the second driving pulse DP2 is periodically generated for each constant unit period Tu in synchronization with the timing signal Tm. The driving timing t1 of the first driving pulse DP1 and the driving timing t2 of the second driving pulse DP2 generated in one unit period Tu are set to be shifted from each other. In other words, the drive cycles of the two common driving signals COM1 and COM2 are set to be shifted from each other.

Figure 10:
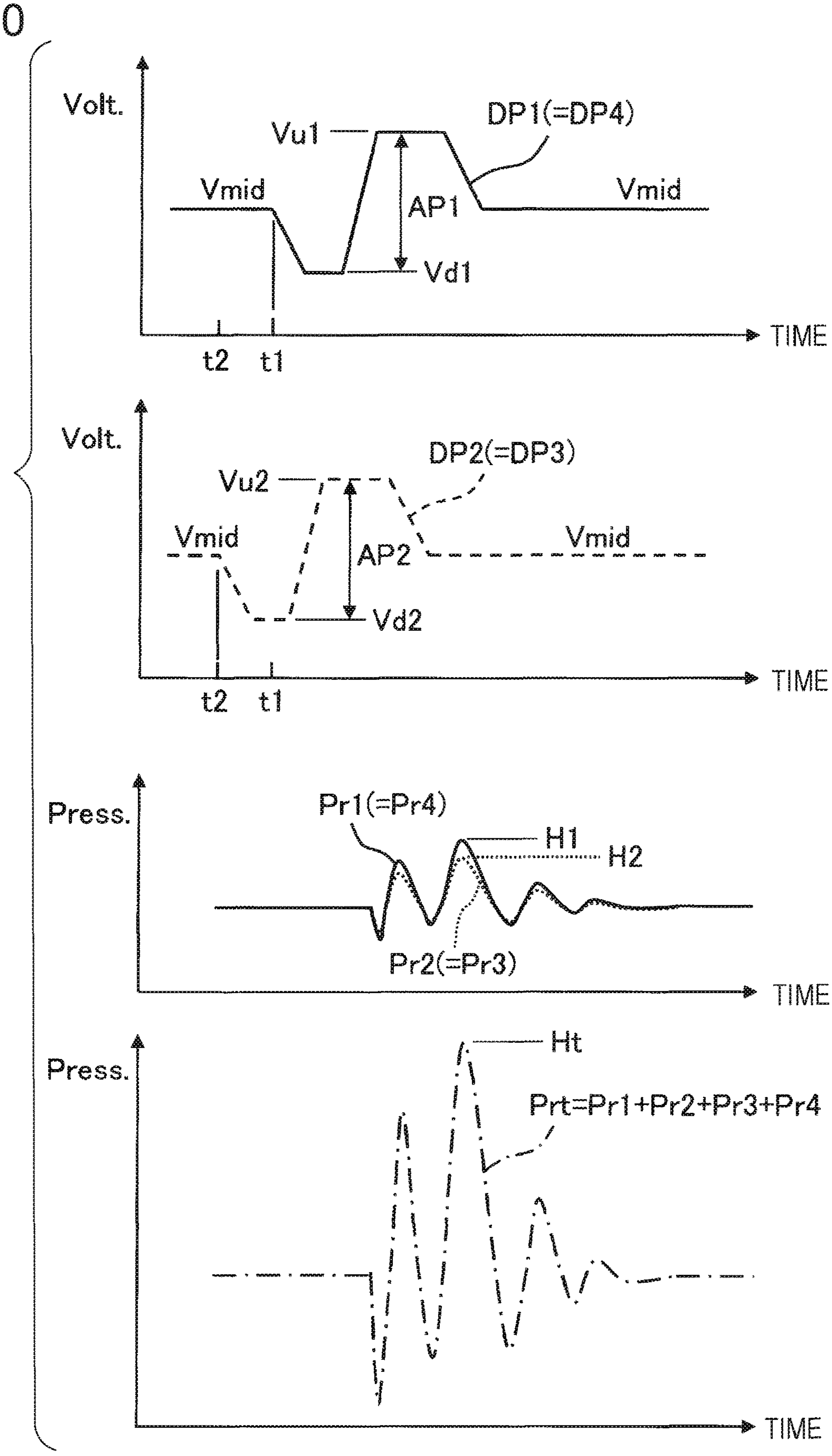
FIG. 10 is a graph illustrating Example 1 of the driving pulse and a pressure change.

FIG. 10 is a graph illustrating Example 1 of the driving pulses DP1 to DP4 in the first embodiment and pressure changes Pr1, Pr2, and Prt caused by these pulses. As described in FIG. 8, the first driving pulse DP1 is supplied to the first driving element 300_1 of the first pressure chamber 330_1 having the short flow path length FL1, and the second driving pulse DP2 is supplied to the second driving element 300_2 of the second pressure chamber 330_2 having the long flow path length FL2.

The first driving pulse DP1 drops substantially linearly from an intermediate potential Vmid at the driving timing t1, and is held for a certain period of time when reaching a lower end potential Vd1. Then the potential rises substantially linearly, and is held for a certain period of time when reaching an upper end potential Vu1. After this, the potential drops substantially linearly again, and returns to the intermediate potential Vmid, which makes a trapezoidal waveform shape. An amplitude AP1 of the first driving pulse DP1 is the difference between the upper end potential Vu1 and the lower end potential Vd1. The potential drop part after the driving timing t1 is a part that performs an operation of pulling the vibrating plate 310 in the −Z direction. Further, the potential rise part where the potential rises from the lower end potential Vd1 is a part that performs an operation of pushing out the vibrating plate 310 in the +Z direction. The pressure wave in the first pressure chamber 330_1 is generated in response to the potential rise part.

The second driving pulse DP2 has the same waveform shape as the first driving pulse DP1, and is generated at the driving timing t2 earlier than the driving timing t1 of the first driving pulse DP1. The intermediate potential Vmid, the lower end potential Vd2, the upper end potential Vu2, and the amplitude AP2 of the second driving pulse DP2 are the same as the intermediate potential Vmid, the lower end potential Vd1, the upper end potential Vu1, and the amplitude AP1 of the first driving pulse DP1, respectively. The shapes of the driving pulses DP1 and DP2 illustrated in FIG. 10 are examples, and various other shapes of driving pulses can be used.

The pressure changes Pr1 and Pr2 illustrated in the third-stage graph of FIG. 10 individually indicate changes in internal pressure generated at the position of the nozzle 200 by the pressure wave generated in the pressure chambers 330_1 and 330_2 in response to the two driving pulses DP1 and DP2. The two pressure changes Pr1 and Pr2 have substantially the same shape, and peak heights H1 and H2 thereof are different from each other. The peak height H2 is less than the peak height H1. The pressure change Prt illustrated in the fourth-stage graph of FIG. 10 indicate the sum of changes in internal pressure generated at the position of the nozzle 200 by the pressure wave generated in the four pressure chambers 330_1 to 330_4 in response to the four driving pulses DP1 and DP4. The peak height Ht of the pressure change Prt is approximately four times the peak heights H1 and H2 of the pressure changes Pr1 and Pr2. In this example, since the peaks of the pressure changes Pr1 and Pr2 are generated at substantially the same timing, the pressure change Prt of the communication flow path 350 at the position of the nozzle 200 can be efficiently increased. As a result, the ejection efficiency of the liquid can be improved.

The driving method using Example 1 of the driving pulses DP1 to DP4 illustrated in FIG. 10 has the following features.

Feature G1

The driving timing of the second driving element 300_2 is earlier than the driving timing of the first driving element 300_1, and the driving timing of the third driving element 300_3 is earlier than the driving timing of the fourth driving element 300_4.

The above-described feature G1 can also be grasped as the following feature G2.

Feature G2

The timing at which the second driving pulse DP2 is applied to the second driving element 300_2 is earlier than the timing at which the first driving pulse DP1 is applied to the first driving element 300_1, and the timing at which the third driving pulse DP3 is applied to the third driving element 300_3 is earlier than the timing at which the fourth driving pulse DP4 is applied to the fourth driving element 300_4.

It is preferable that the timing at which each of the driving pulses DP1 to DP4 is applied to each of the driving elements 300_1 to 300_4 be set such that the pressure waves generated by driving the driving elements 300_1 to 300_4 increase the pressure at the position of the nozzle 200 without canceling each other out. As an example, whether or not the two pressure waves generated by driving the two driving elements 300_1 and 300_2 increase the pressure without canceling each other out is can be determined by comparing a first liquid amount of the liquid ejected from the nozzle 200 when the two driving elements 300_1 and 300_2 are driven, and a second liquid amount of the liquid ejected from the nozzle 200 when driving only one driving element 300_1. That is, when the first liquid amount is equal to or less than the second liquid amount, it can be determined that the two pressure waves generated by driving the two driving elements 300_1 and 300_2 cancel each other out. On the other hand, when the first liquid amount is greater than the second liquid amount, it can be determined that the two pressure waves generated by driving the two driving elements 300_1 and 300_2 increase the pressure without canceling each other out. It is preferable to adjust the timings of the driving pulses DP1 and DP2 such that the first liquid amount is 1.5 times or more the second liquid amount. Further, when the four driving elements 300_1 to 300_4 are driven as in FIG. 8, it is preferable to adjust the timings of the driving pulses DP1 to DP4 such that the first liquid amount of the liquid ejected from the nozzle 200 when the four driving elements 300 are driven is three times or more the second liquid amount of the liquid ejected from the nozzle 200 when only one driving element 300_1 is driven.

In addition, when adjusting the driving timings of the driving pulses DP1 and DP2 such that the liquid amount when the driving pulses DP1 and DP2 are supplied to the driving elements 300_1 to 300_4 is greater than the liquid amount when the same driving pulse DP1 is supplied to each of the driving elements 300_1 to 300_4, it is possible to obtain a composite wave in which peaks of the pressure wave are combined with each other at the same timing, and to improve the ejection efficiency.

Figure 11:
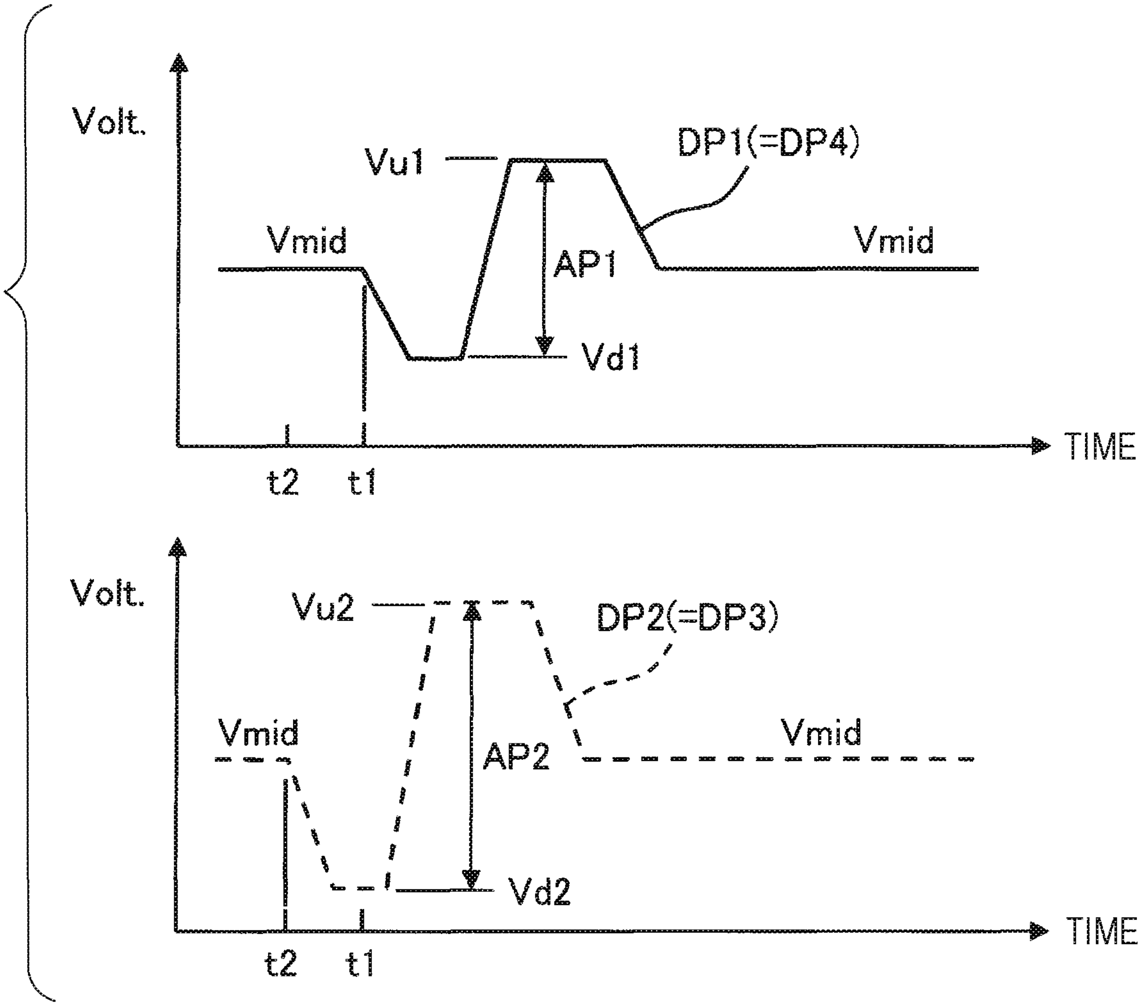
FIG. 11 is a graph illustrating Example 2 of the driving pulse.

FIG. 11 is a graph illustrating Example 2 of the driving pulses DP1 to DP4. The difference between Example 2 and Example 1 illustrated in FIG. 10 is only the waveform of the second driving pulse DP2, and the first driving pulse DP1 is the same as Example 1. Note that, in FIG. 11, the graph of the pressure change is omitted.

The driving method using the driving pulses DP1 to DP4 of Example 2 has the following features.

Feature G3

The amplitude AP2 of the second driving pulse DP2 is greater than the amplitude AP1 of the first driving pulse DP1, and the amplitude of the third driving pulse DP3 is greater than the amplitude of the fourth driving pulse DP4.

For example, the lower end potential Vd2 of the second driving pulse DP2 is set lower than the lower end potential Vd1 of the first driving pulse DP1, and the upper end potential Vu2 of the second driving pulse DP2 is set higher than the upper end potential Vu1 of the first driving pulse DP1.

The reason for adopting the above-described feature G3 is to eliminate the difference in the attenuation amount in a case where the difference cannot be ignored, when considering the attenuation amount at which the pressure waves generated in each of the four pressure chambers 330_1 to 330_4 are attenuated before reaching the position of the nozzle 200. In the example of FIG. 8, since the flow path lengths FL2 and FL3 from the two pressure chambers 330_2 and 330_3 to the nozzle 200 are longer than the flow path lengths FL1 and FL4 from the other two pressure chambers 330_1 and 330_4 to the nozzle 200, it is assumed that the attenuation amount of the pressure wave generated in the two pressure chambers 330_2 and 330_3 becomes large to the extent that the attenuation amount cannot be ignored. In this case, by adopting the above-described feature G3, it is possible to eliminate the difference in the attenuation amount of the pressure wave. That is, the pressure changes generated at the positions of the nozzles 200 due to the pressure waves of the four pressure chambers 330_1 to 330_4 can be made substantially the same, and the ejection efficiency can be improved. When the peak height of the pressure change generated at the position of the nozzle 200 according to the first driving pulse DP1 is set to 100%, it is preferable to adjust the amplitude AP2 of the second driving pulse DP2 such that the peak height of the pressure change generated at the position of the nozzle 200 according to the second driving pulse DP2 falls within the range of 100±5%.

The relationship between the difference in the attenuation amount of the pressure wave and the ejection efficiency of the liquid can be understood as follows. For example, when the same pressure change is generated in the first pressure chamber 330_1 and the second pressure chamber 330_2 having different flow path lengths, at the position of the nozzle 200, the amplitude of the pressure wave of the second pressure chamber 330_2 having a longer flow path length further decreases. Therefore, the pressure wave from the first pressure chamber 330_1 is transmitted toward the second pressure chamber 330_2, which may cause a concern that the ejection efficiency decreases. However, by making the pressure change generated in the second pressure chamber 330_2 having a long flow path length greater than that in the first pressure chamber 330_1, it is possible to suppress transmission of the pressure wave from the first pressure chamber 330_1 toward the second pressure chamber 330_2, and to improve ejection efficiency.

The above-described feature G3 can also be understood as the following features.

Feature G4

The magnitude of the pressure change of the liquid in the second pressure chamber 330_2 generated by driving the second driving element 300_2 is greater than the magnitude of the pressure change of the liquid in the first pressure chamber 330_1 generated by driving the first driving element 300_1. Similarly, the magnitude of the pressure change of the liquid in the third pressure chamber 330_3 generated by driving the third driving element 300_3 is greater than the magnitude of the pressure change of the liquid in the fourth pressure chamber 330_4 generated by driving the fourth driving element 300_4.

Feature G5

The displacement amount of the second vibration section 312 of the vibrating plate 310 illustrated in FIG. 3 is greater than the displacement amount of the first vibration section 311, and the displacement amount of the third vibration section 313 is greater than the displacement amount of the fourth vibration section 314.

Here, the displacement amount of the vibration section of the vibrating plate 310 is a difference between the position when the vibration section is displaced to the most +Z side and the position when the vibration section is displaced to the most −Z side, when the driving pulse DP1 or the driving pulse DP2 is applied.

The driving method using Example 2 of the driving pulses DP1 and DP2 illustrated in FIG. 11 may have a possibility of increasing the ejection efficiency of the liquid as compared with the driving method using Example 1 illustrated in FIG. 10.

Figure 12:
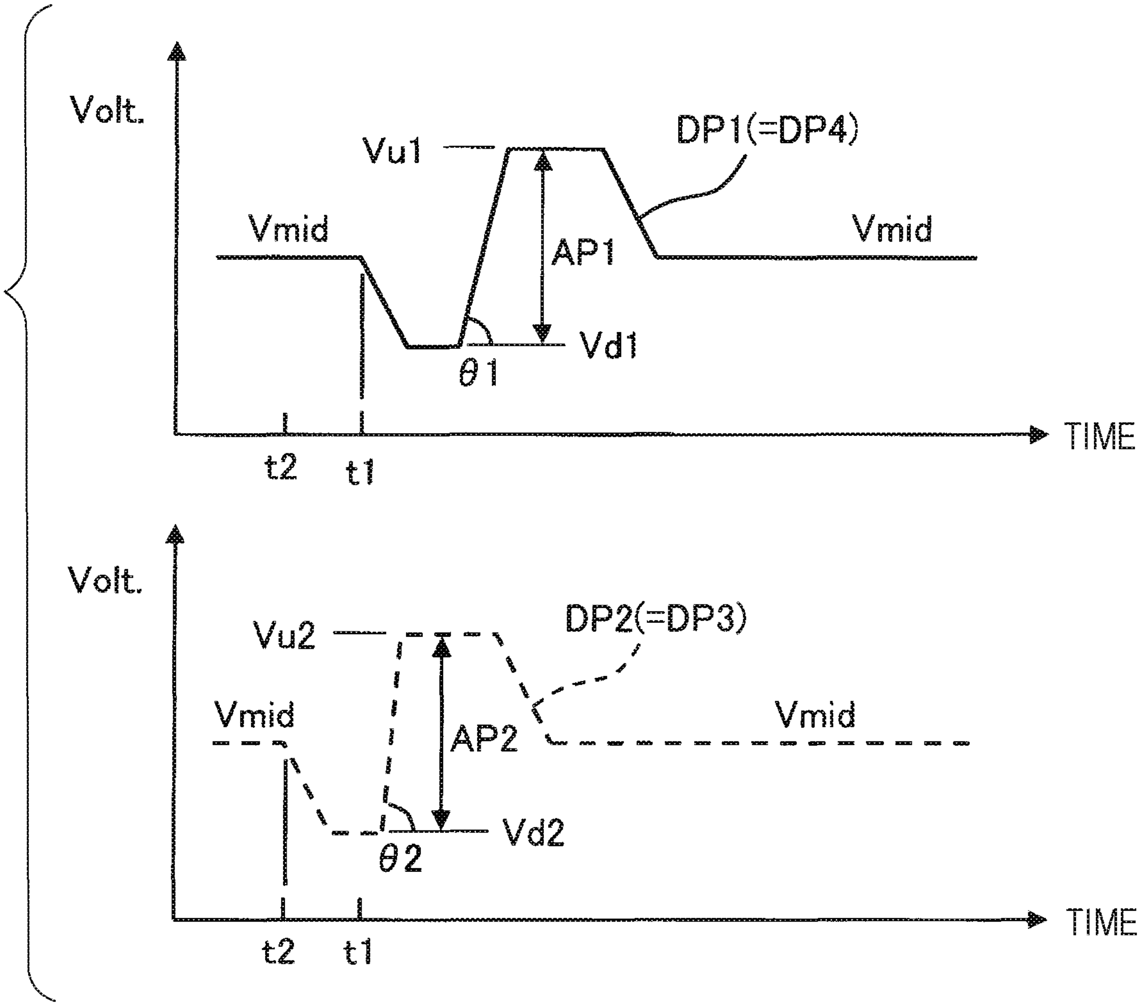
FIG. 12 is a graph illustrating Example 3 of the driving pulse.

FIG. 12 is a graph illustrating Example 3 of the driving pulses DP1 to DP4. The difference between Example 3 and Example 1 illustrated in FIG. 10 is only the waveform of the second driving pulse DP2, and the first driving pulse DP1 is the same as Example 1.

In the second driving pulse DP2 of Example 3, the inclination of the trapezoidal wave is set to be greater than that of the first driving pulse DP1. That is, the inclination θ1 of the potential rise part of the second driving pulse DP2 is set to be greater than the inclination θ1 of the potential rise part of the first driving pulse DP1. The amplitude AP2 of the second driving pulse DP2 is the same as the amplitude AP1 of the first driving pulse DP1. Further, the lower end potential Vd2 of the second driving pulse DP2 is the same as the lower end potential Vd1 of the first driving pulse DP1, and the upper end potential Vu2 of the second driving pulse DP2 is the same as the upper end potential Vu1 of the first driving pulse DP1. In addition, the driving timing t2 of the second driving pulse DP2 is earlier than the driving timing t1 of the first driving pulse DP1.

When a piezoelectric element is used as the driving element 300, the displacement speed of the vibrating plate 310 can be increased by increasing the inclination θ2 of the potential rise part of the trapezoidal wave as illustrated in FIG. 12. That is, the amplitude of the pressure wave can be increased by making the inclination θ2 of the waveform when the vibrating plate 310 is pushed out in the Z direction steep without increasing the amplitude AP2.

In addition, when a trapezoidal wave is used, the vibration of the driving element 300 tend to be started earlier as the inclination θ2 of the potential rise part is increased. Therefore, even when the driving timing t2 of the second driving pulse DP2 is set to be the same as the driving timing t1 of the first driving pulse DP1, it is possible to make the substantial driving timing of the second driving element 300_2 early. In consideration of this point, the driving timing t2 of the second driving pulse DP2 may be set to be the same as the driving timing t1 of the first driving pulse DP1. Also in this case, the driving timings t1 and t2 of the driving pulses DP1 and DP2 are preferable when the pressure waves generated by driving the driving elements 300_1 and 300_2 increase the pressure at the position of the nozzle 200 without canceling each other out.

Figure 13:
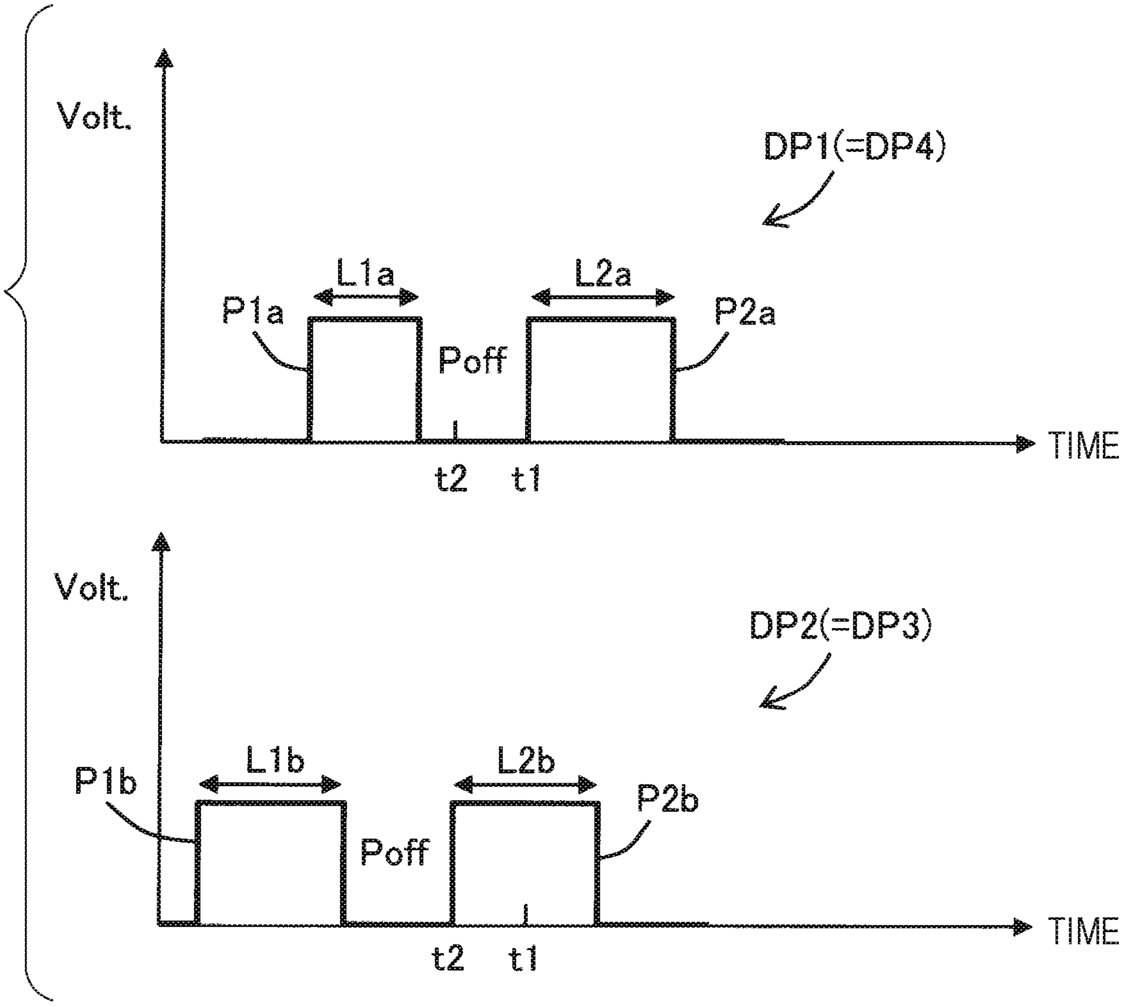
FIG. 13 is a graph illustrating Example 4 of the driving pulse.

FIG. 13 is a graph illustrating Example 4 of the driving pulses DP1 to DP4. These driving pulses DP1 to DP4 can be used when a heat generating element is used as the driving element 300 instead of the piezoelectric element. The first driving pulse DP1 is a pulse having a rectangular shape including a first pulse part P1*a* as a pre-pulse, a second pulse part P2*a* as a main pulse, and an off part Poff having a predetermined length therebetween. The first pulse part P1*a* is a part that controls the degree of film boiling of the liquid in the pressure chamber 330, and the second pulse part P2*a* is a part that becomes a trigger for ejecting the liquid in a state where the second pulse part P2*a* is film-boiled. Therefore, the rise timing of the second pulse part P2*a* is set as the ejection driving timing t1. Similarly to the first driving pulse DP1, the second driving pulse DP2 is also pulse having a rectangular shape including a first pulse part P1*b* as a pre-pulse, a second pulse part P2*b* as a main pulse, and an off part Poff having a predetermined length therebetween, and the rise timing of the second pulse part P2*b* is set as the ejection driving timing t2.

In the driving pulses DP1 and DP2 of Example 4, when the pulse widths of the first pulse parts P1*a* and P1*b* are lengthened, the film boiling becomes strong and the energy amount becomes large. On the other hand, since the second pulse parts P2*a* and P2*b* are merely triggers for ejection, there is almost no effect even when the pulse width is changed. Normally, the time width that can be used for one ejection is fixed. Therefore, for example, when the first pulse part P1*b* of the second driving pulse DP2 is lengthened, the second pulse part P2*b* is shortened by that amount, and the total length of the second driving pulse DP2 can be made constant. For example, in order to change the magnitude of the pressure change in the second pressure chamber 330_2, the width of the first pulse part P1*b* may be increased and the width of the second pulse part P2*b* may be shortened. Even in this case, when the peak height of the pressure change generated at the position of the nozzle 200 according to the first driving pulse DP1 is set to 100%, it is preferable to adjust the width of the first pulse part P1*b* such that the peak height of the pressure change generated at the position of the nozzle 200 according to the second driving pulse DP2 falls within the range of 100±5%.

Instead of adjusting the width of the first pulse part P1*b*, the number of times of the first pulse part P1*b* included in one driving pulse DP2 may be increased to increase the energy amount given to the liquid in the pressure chamber 330_2. Alternatively, similarly to the case of using the piezoelectric element, the energy amount given to the liquid in the pressure chamber 330_2 may be increased by increasing the voltage value of the first pulse part P1*b*.

The following features can be grasped from the examples of the driving pulses illustrated in FIGS. 10 to 13.

Feature G6

At least one of the timing and waveform of the driving pulses DP1 and DP2 is adjusted such that the pressure wave generated in the first pressure chamber 330_1 and the pressure wave generated in the second pressure chamber 330_2 increase the pressure at the position of the nozzle 200 without canceling each other out.

Feature G7

The waveforms of the driving pulses DP1 and DP2 are adjusted to eliminate the difference in the attenuation amount of the pressure wave caused by the difference in the flow path lengths FL1 and FL2. Specifically, when the peak height of the pressure change generated at the position of the nozzle 200 according to the first driving pulse DP1 is set to 100%, it is preferable to adjust the waveform such that the peak height of the pressure change generated at the position of the nozzle 200 according to the second driving pulse DP2 falls within the range of 100±5%.

According to the head driving method according to the first embodiment described above, by providing at least some of the above-described features G1 to G7, the shift of the pressure wave caused by the difference in the flow path lengths FL1 to FL4 from the nozzle 200 to the pressure chambers 330_1 to 330_4 is reduced, and the ejection efficiency can be improved.

C. Other Embodiments

Figure 14:
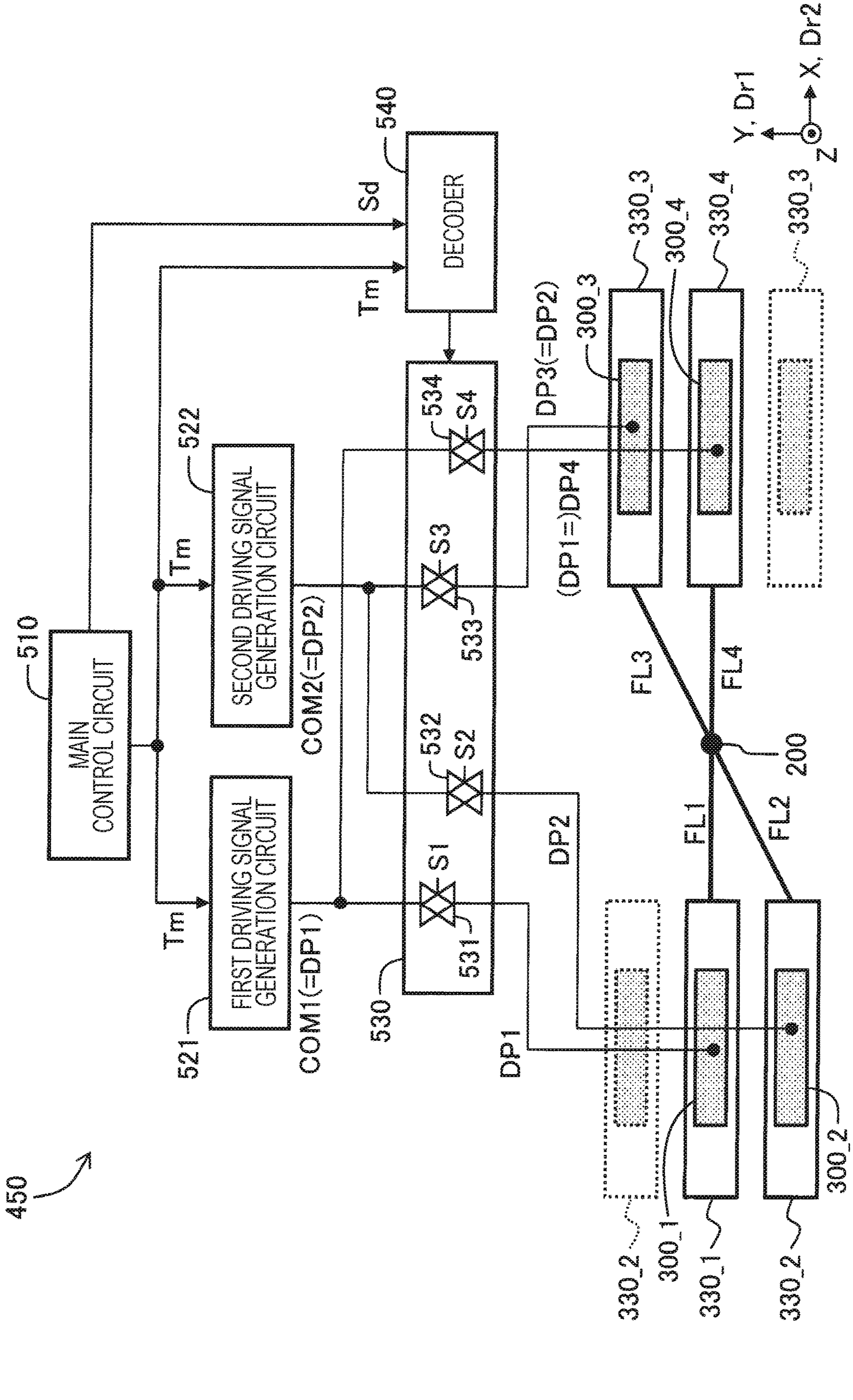
FIG. 14 is an explanatory diagram illustrating a head drive function of a control section according to a second embodiment.

FIG. 14 is an explanatory diagram illustrating a head drive function of the control section 450 according to the second embodiment. The second embodiment is mainly different from the first embodiment described above only in the positional relationship between the plurality of pressure chambers 330_1 to 330_4 in plan view in the Z direction, and has other apparatus configurations and control operations, which are substantially the same as those of the first embodiment.

In the first embodiment described with reference to FIG. 8, the plurality of pressure chambers 330_1 to 330_4 are arranged in a staggered pattern, but in the second embodiment, the plurality of pressure chambers 330_1 to 330_4 are not arranged in a staggered pattern. That is, the first pressure chamber 330_1 and the fourth pressure chamber 330_4 are arranged at the same position with respect to the first direction Dr1. The second pressure chamber 330_2 and the third pressure chamber 330_3 indicated by the dotted line are pressure chambers for other nozzles adjacent to each other. For example, the second pressure chamber 330_2 is disposed at the same position as the third pressure chamber 330_3 for another nozzle adjacent to the −Y side with respect to the first direction Dr1.

In this second embodiment, the formulas (1a) to (1d) described in the first embodiment are also satisfied. In addition, the driving timings and waveform shapes of the driving pulses DP1 and DP2 may be adjusted according to the above-described features G6 and G7. The second embodiment also has substantially the same effect as that of the first embodiment, and can improve the ejection efficiency of the liquid.

Figure 15:
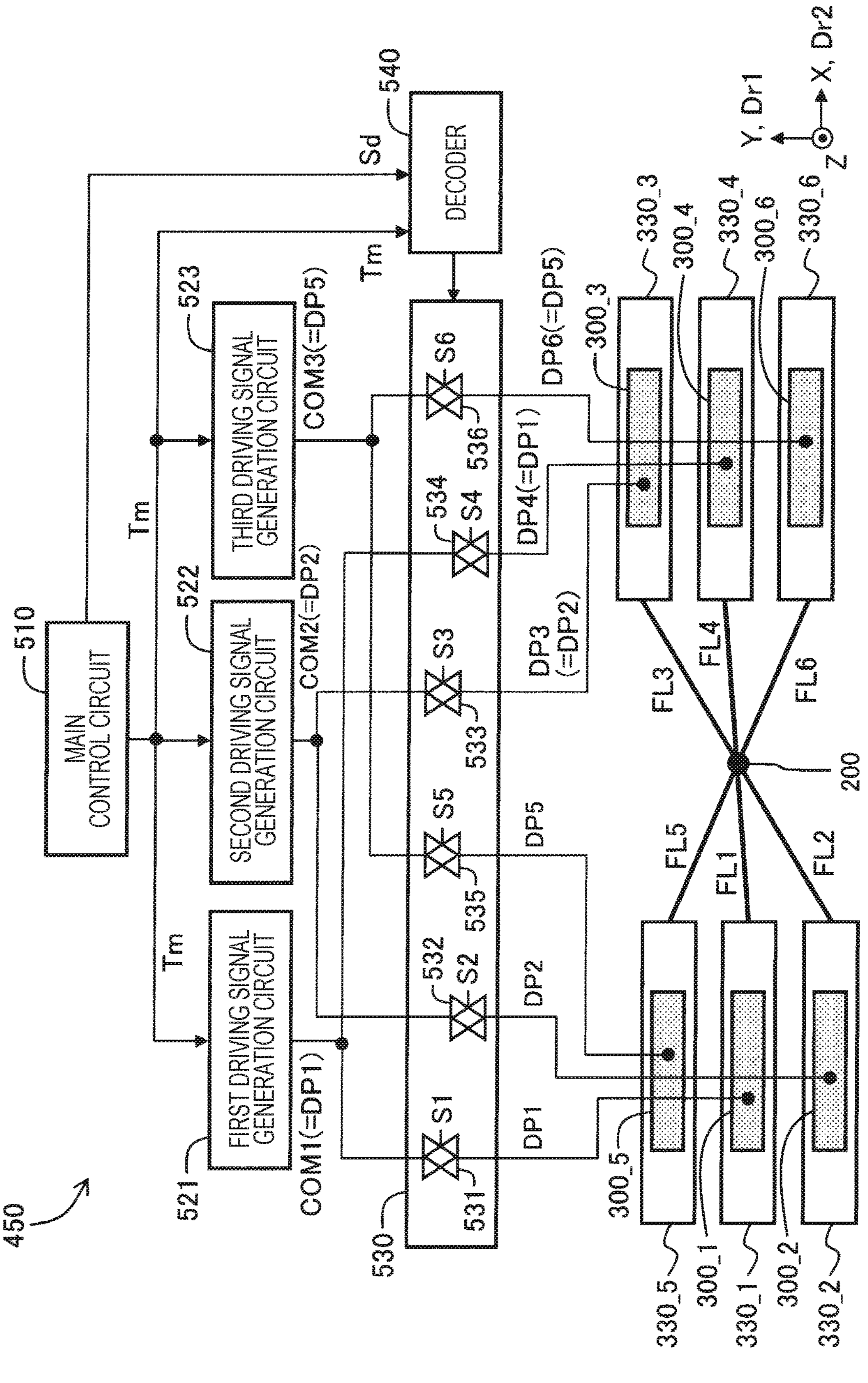
FIG. 15 is an explanatory diagram illustrating a head drive function of a control section according to a third embodiment.

FIG. 15 is an explanatory diagram illustrating a head drive function of the control section 450 according to the third embodiment. The third embodiment is mainly different from the first embodiment described above only in that a fifth pressure chamber 330_5 and a sixth pressure chamber 330_6 are added as pressure chambers communicating with the nozzle 200, and a third driving signal generation circuit 523 is added, and has other apparatus configurations and control operations, which are substantially the same as those of the first embodiment.

The fifth pressure chamber 330_5 is disposed on the −X side, which is one side with respect to the nozzle 200, similar to the first pressure chamber 330_1 and the second pressure chamber 330_2, in plan view in the Z direction. The sixth pressure chamber 330_6 is disposed on the +X side, which is the other side of the nozzle 200, similar to the third pressure chamber 330_3 and the fourth pressure chamber 330_4. The plurality of pressure chambers 330_1 to 330_6 are arranged in a staggered pattern. That is, the pressure chambers 330_1, 330_2, and 330_5 arranged on one side with respect to the nozzle 200 and the pressure chambers 330_3, 330_4, and 330_6 arranged on the other side are arranged at positions where the positions thereof in the first direction Dr1 are shifted from each other.

In the third embodiment, the following formulas are satisfied for the flow path lengths FL1 to FL6 from the six pressure chambers 330_1 to 330_6 to the nozzle 200.

$$FL1<FL5<FL2 \quad (3a)$$

$$FL4<FL6<FL3 \quad (3b)$$

$$FL1=FL4 \quad (3c)$$

$$FL2=FL3 \quad (3d)$$

$$FL5=FL6 \quad (3e)$$

The third driving signal generation circuit 523 generates the third common driving signal COM3 including the driving pulses DP5 and DP6 supplied to the driving element 300_5 of the fifth pressure chamber 330_5 and the driving element 300_6 of the sixth pressure chamber 330_6. The same driving pulses DP5 and DP6 can be used. The switch circuit 530 has the analog switches 531 to 536 corresponding to a plurality of driving elements 300_1 to 300_6. The decoder 540 decodes the dot size signal Sd given from the main control circuit 510 to generate the control signals S1 to S6 that realize the dot size represented by the dot size signal Sd. These control signals S1 to S6 are given to the control terminals of the analog switches 531 to 536, respectively.

Figure 16:
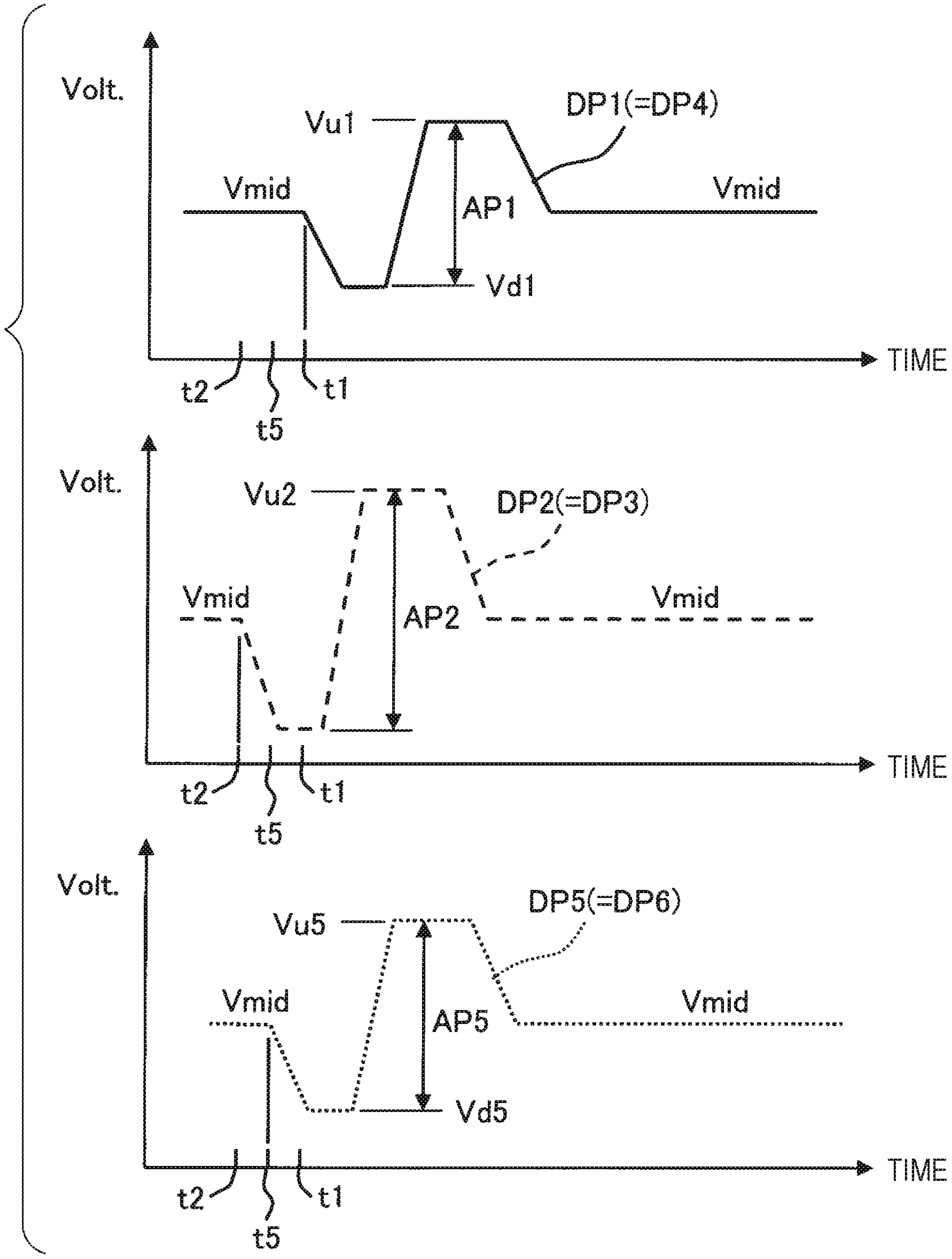
FIG. 16 is a graph illustrating an example of a driving pulse according to the third embodiment.

FIG. 16 is a graph illustrating the driving pulses DP1 to DP6 in the third embodiment. The first driving pulse DP1 and the second driving pulse DP2 are the same as in Example 2 of the first embodiment illustrated in FIG. 11. The fifth driving pulse DP5 is generated at the driving timing t5 that is earlier than the driving timing t1 of the first driving pulse DP1 and later than the driving timing t2 of the second driving pulse DP2. The amplitude AP5 of the fifth driving pulse DP5 is greater than the amplitude AP1 of the first driving pulse DP1 and less than the amplitude AP2 of the second driving pulse DP2. Further, the lower end potential Vd5 of the fifth driving pulse DP5 is lower than the lower end potential Vd1 of the first driving pulse DP1 and higher than the lower end potential Vd2 of the second driving pulse DP2. The upper end potential Vu5 of the fifth driving pulse DP5 is higher than the upper end potential Vu1 of the first driving pulse DP1 and lower than the upper end potential Vu2 of the second driving pulse DP2. However, the amplitudes AP1, AP2, and AP5 of the three types of driving pulses DP1, DP2, and DP5 may be the same. In addition, the driving timings and waveform shapes of the fifth driving pulse DP5 may be adjusted according to the above-described features G6 and G7.

The driving method of the third embodiment has the following features.

Feature G8

The driving timing of the fifth driving element 300_5 is earlier than the driving timing of the first driving element 300_1, and is later than the driving timing of the second driving element 300_2. Similarly, the driving timing of the sixth driving element 300_6 is earlier than the driving timing of the fourth driving element 300_4 and later than the driving timing of the third driving element 300_3.

Feature G9

The timing of applying the fifth driving pulse DP5 to the fifth driving element 300_5 is earlier than the timing at which the first driving pulse DP1 is applied to the first driving element 300_1, and is later than the timing at which the second driving pulse DP2 is applied to the second driving element 300_2. Similarly, the timing at which the sixth driving pulse DP6 is applied to the sixth driving element 300_6 is earlier than the timing at which the fourth driving pulse DP4 is applied to the fourth driving element 300_4, and is later than the timing at which the third driving pulse DP3 is applied to the third driving element 300_3.

Feature G10

The amplitude AP5 of the fifth driving pulse DP5 is greater than the amplitude AP1 of the first driving pulse DP1 and less than the amplitude AP2 of the second driving pulse DP2. Similarly, the amplitude of the sixth driving pulse DP6 is greater than the amplitude of the fourth driving pulse DP4 and less than the amplitude of the third driving pulse DP3.

Feature G11

The magnitude of the pressure change of the liquid in the fifth pressure chamber 330_5 caused by driving the fifth driving element 300_5 is greater than the magnitude of the pressure change of the liquid in the first pressure chamber 330_1 caused by driving the first driving element 300_1, and is less than the magnitude of the pressure change of the liquid in the second pressure chamber 330_2 generated by driving the second driving element 300_2. Similarly, the magnitude of the pressure change of the liquid in the sixth pressure chamber 330_6 generated by driving the sixth driving element 300_6 is greater than the magnitude of the pressure change of the liquid in the fourth pressure chamber 330_4 generated by driving the fourth driving element 300_4, and is less than the magnitude of the pressure change of the liquid in the third pressure chamber 330_3 generated by driving the third driving element 300_3.

The third embodiment described above has the same effects as those of the first embodiment and the second embodiment, and can improve the ejection efficiency of the liquid.

Figure 17:
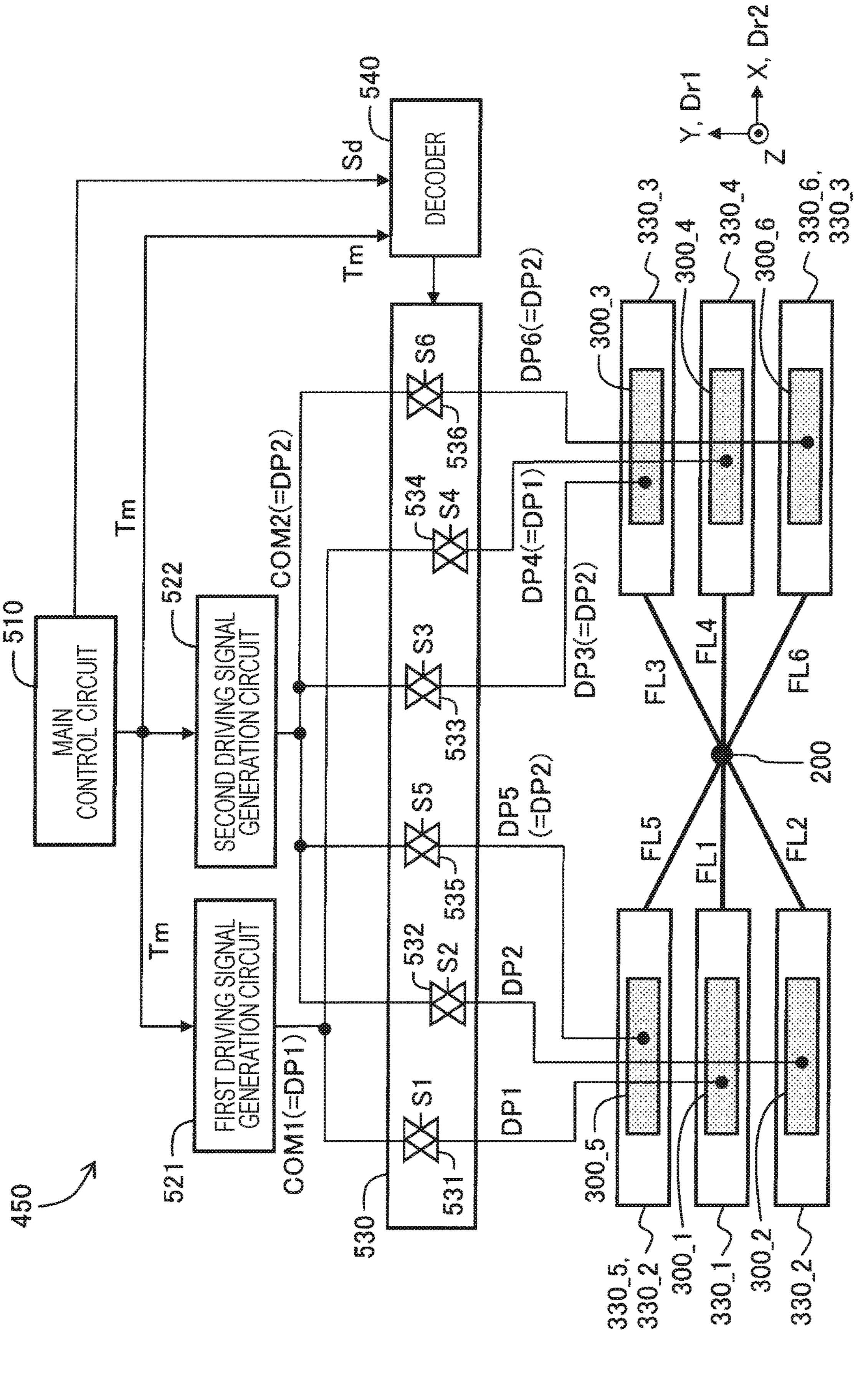
FIG. 17 is an explanatory diagram illustrating a head drive function of a control section according to a fourth embodiment.

FIG. 17 is an explanatory diagram illustrating a head drive function of the control section 450 according to the fourth embodiment. The fourth embodiment is mainly different from the third embodiment described above in that the pressure chambers 330_1 to 330_6 are not arranged in a staggered pattern, in that the flow path lengths FL1 to FL6 from the pressure chambers 330_1 to 330_6 to the nozzle 200 is different from those of FIG. 15, and in that the third driving signal generation circuit 523 is omitted, and has other apparatus configurations and control operations, which are substantially the same as those of the third embodiment.

The plurality of pressure chambers 330_1 to 330_6 of the fourth embodiment are not arranged in a staggered pattern as in the second embodiment illustrated in FIG. 14. For example, the fifth pressure chamber 330_5 and the third pressure chamber 330_3 are arranged at the same position in the first direction Dr1. Further, the first pressure chamber 330_1 and the fourth pressure chamber 330_4 are also arranged at the same position in the first direction Dr1, and the second pressure chamber 330_2 and the sixth pressure chamber 330_6 are also arranged at the same position in the first direction Dr1.

In the fourth embodiment, the following formulas are satisfied for the flow path lengths FL1 to FL6 from the six pressure chambers 330_1 to 330_6 to the nozzle 200.

$$FL1<FL2 \quad (4a)$$

$$FL4<FL3 \quad (4b)$$

$$FL1=FL4 \quad (4d)$$

$$FL2=FL3=FL5=FL6 \quad (4e)$$

In the fourth embodiment, the third driving pulse DP3, the fifth driving pulse DP5, and the sixth driving pulse DP6 are the same as the second driving pulse DP2. The timing and waveform shape of the driving pulses DP1 to DP6 of the fourth embodiment may be adjusted according to the above-described features G6 and G7.

In the fourth embodiment, since the flow path length FL5 from the fifth pressure chamber 330_5 to the nozzle 200 is equal to the flow path length FL2 from the second pressure chamber 330_2 to the nozzle 200, it is possible to consider the fifth pressure chamber 330_5 to be equivalent to the second pressure chamber 330_2. Further, since the flow path length FL6 from the sixth pressure chamber 330_6 to the nozzle 200 is equal to the flow path length FL3 from the third pressure chamber 330_3 to the nozzle 200, it is possible to consider the sixth pressure chamber 330_6 to be equivalent to the third pressure chamber 330_3. In other words, the liquid ejecting head 100 of the fourth embodiment can be considered to have two second pressure chambers 330_2 and two third pressure chambers 330_3, respectively.

The fourth embodiment described above has the same effect as that of the first embodiment, and can improve the ejection efficiency of the liquid.

Figure 18:
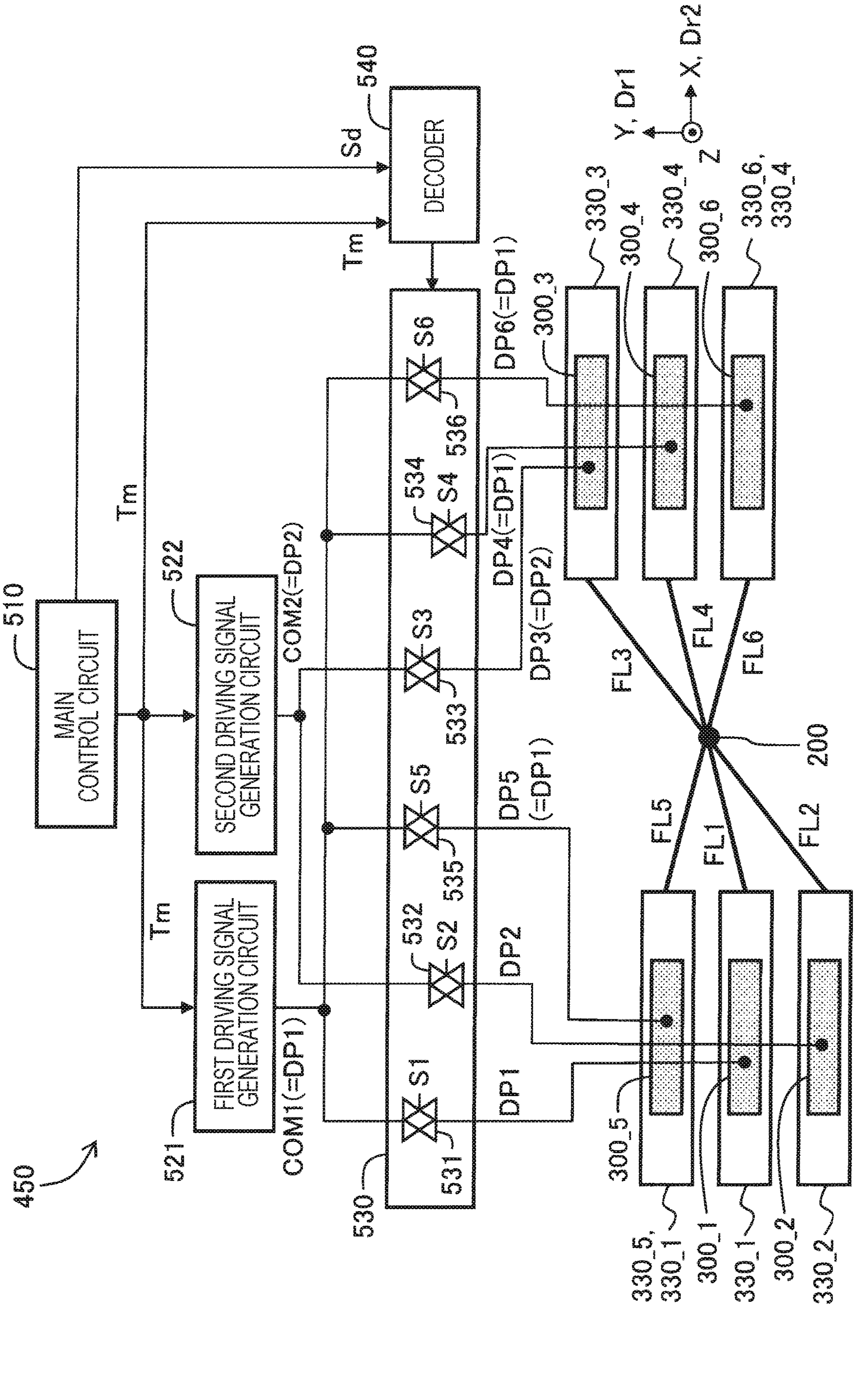
FIG. 18 is an explanatory diagram illustrating a head drive function of a control section according to a fifth embodiment.

FIG. 18 is an explanatory diagram illustrating a head drive function of the control section 450 according to the fifth embodiment. The fifth embodiment is mainly different from the fourth embodiment described above in that the positional relationship of the pressure chambers 330_1, 330_2, and 330_5 arranged on one side of the nozzle 200 and the pressure chambers 330_2, 330_4, and 330_6 arranged on the other side of the nozzle 200 is shifted in the first direction Dr1 from FIG. 17, and has other apparatus configurations and control operations, which are substantially the same as those of the fourth embodiment. In this embodiment, the pressure chamber 330_5 and the pressure chamber 330_4 are at the same position, and the pressure chamber 330_1 and the pressure chamber 330_6 are at the same position in the first direction Dr1. That is, the plurality of pressure chambers 330 are not arranged in a staggered pattern. That is, in plan view, the nozzle 200 is positioned at the intersection of a line segment coupling the center of the pressure chamber 330_1 and the center of the pressure chamber 330_4, a line segment coupling the center of the pressure chamber 330_2 and the center of the pressure chamber 330_3, and a line segment coupling the center of the pressure chamber 330_5 and the center of the pressure chamber 330_6.

In the fifth embodiment, the following formulas are satisfied for the flow path lengths FL1 to FL6 from the six pressure chambers 330_1 to 330_6 to the nozzle 200.

$$FL1<FL2 \quad (5a)$$

$$FL4<FL3 \quad (5b)$$

$$FL1=FL4=FL5=FL6 \quad (5c)$$

$$FL2=FL3 \quad (5d)$$

In the fifth embodiment, the fifth driving pulse DP5 and the sixth driving pulse DP6 are the same as the first driving pulse DP1. Further, the driving timings and waveform shapes of the driving pulses DP1 to DP6 of the fifth embodiment may be adjusted according to the above-described features G6 and G7.

In the fifth embodiment, since the flow path length FL5 from the fifth pressure chamber 330_5 to the nozzle 200 is equal to the flow path length FL1 from the first pressure chamber 330_1 to the nozzle 200, it is possible to consider the fifth pressure chamber 330_5 to be equivalent to the first pressure chamber 330_1. Further, since the flow path length FL6 from the sixth pressure chamber 330_6 to the nozzle 200 is equal to the flow path length FL4 from the fourth pressure chamber 330_4 to the nozzle 200, it is possible to consider the sixth pressure chamber 330_6 to be equivalent to the fourth pressure chamber 330_4. In other words, the liquid ejecting head 100 of the fifth embodiment can be considered to have two first pressure chambers 330_1 and two fourth pressure chambers 330_4, respectively.

The fifth embodiment described above has the same effect as that of the first embodiment, and can improve the ejection efficiency of the liquid.

Figure 19:
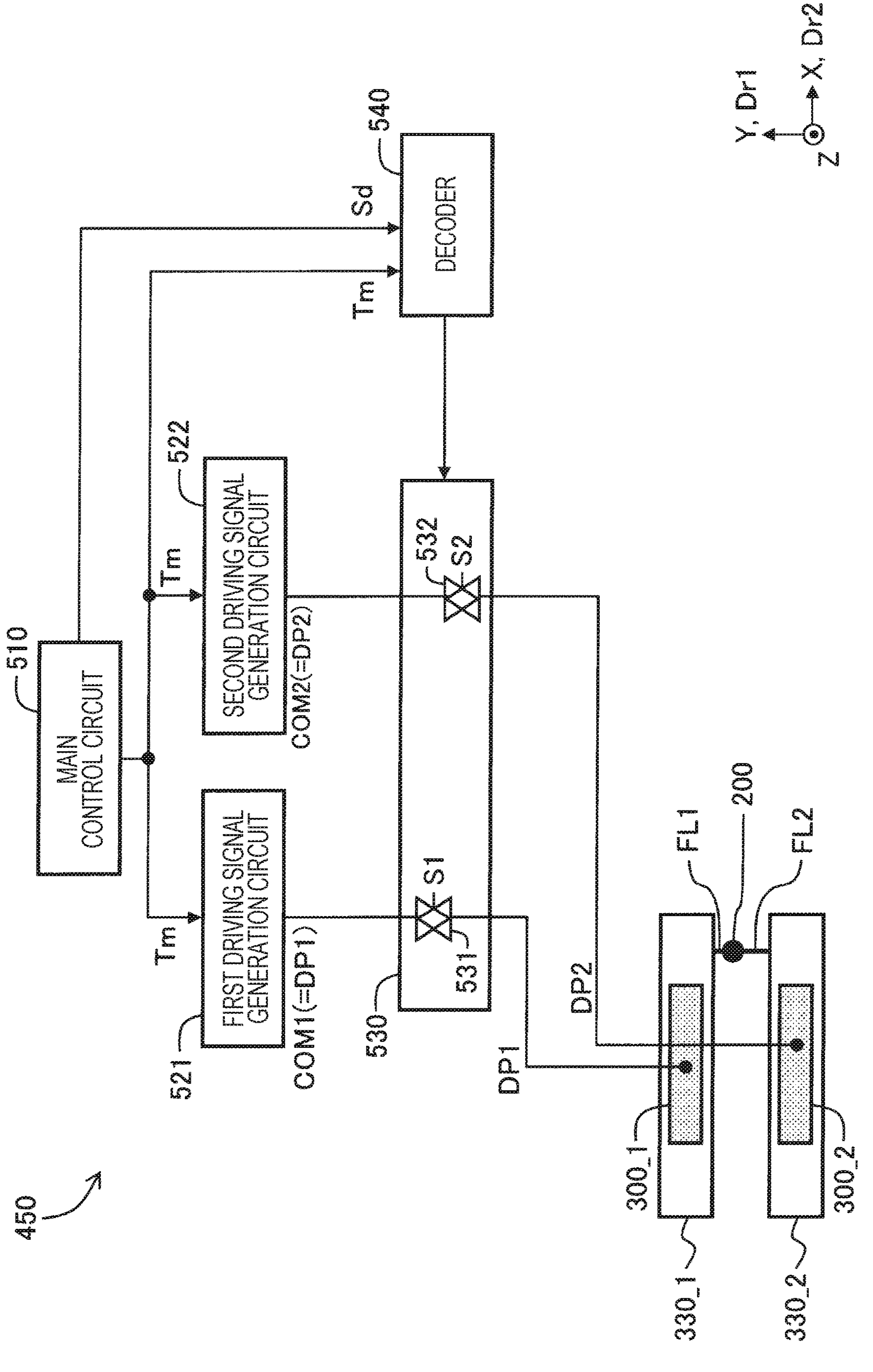
FIG. 19 is an explanatory diagram illustrating a head drive function of a control section according to a sixth embodiment.

FIG. 19 is an explanatory diagram illustrating a head drive function of the control section 450 according to the sixth embodiment. The sixth embodiment is mainly different from the first embodiment described above in that the third pressure chamber 330_3 and the fourth pressure chamber 330_4 are omitted, and in that the nozzle 200 is disposed between the two pressure chambers 330_1 and 330_2, and has other apparatus configurations and control operations, which are substantially the same as those of the first embodiment. In plan view in the Z direction, the two pressure chambers 330_1 and 330_2 extend in the X direction, and the longitudinal directions thereof are parallel to the X direction. Further, the two pressure chambers 330_1 and 330_2 are arranged in the Y direction perpendicular to the X direction. The nozzle 200 is disposed at a position sandwiched between the two pressure chambers 330_1 and 330_2.

In the sixth embodiment, similarly to the first embodiment, the flow path length FL1 from the first pressure chamber 330_1 to the nozzle 200 is also shorter than the flow path length FL2 from the second pressure chamber 330_2 to the nozzle 200. The position of the nozzle 200 can be set to any position other than the position illustrated in FIG. 18. For example, the nozzle 200 may be disposed at a position overlapping the first pressure chamber 330_1 in plan view in the Z direction. In this case, the first flow path length FL1 substantially corresponds to the flow path length of the communication hole 341 coupled to the first pressure chamber 330_1, and the second flow path length FL2 substantially corresponds to the flow path length obtained by summing the flow path length of the communication hole 342 coupled to the second pressure chamber 330_2 and the flow path length of the communication flow path 350 coupling the communication hole 341 and the communication hole 342.

The sixth embodiment has the following features G12 and G13 as superordinate concepts of the features G1 and G2 of the first embodiment described above.

Feature G12

The driving timing of the second driving element 300_2 is earlier than the driving timing of the first driving element 300_1.

Feature G13

The timing at which the second driving pulse DP2 is applied to the second driving element 300_2 is earlier than the timing at which the first driving pulse DP1 is applied to the first driving element 300_1.

As described in the first embodiment, the driving timings of the above-described features G12 and G13 are preferably determined such that the pressure waves generated by driving the driving elements 300_1 and 300_2 are strengthened at the position of the nozzle 200 without canceling each other out.

The driving timings and waveform shapes of the driving pulses DP1 and DP2 of the sixth embodiment may be adjusted according to the above-described features G6 and G7. The sixth embodiment has the same effect as that of the first embodiment, and can improve the ejection efficiency of the liquid.

As can be understood from the first to sixth embodiments, in the driving method of the liquid ejecting head 100 in the present disclosure can be realized as a method of ejecting the liquid from the nozzle 200 by driving at least the first driving element 300_1 and the second driving element 300_2 by using the liquid ejecting head 100 including at least the first pressure chamber 330_1 and the second pressure chamber 330_2.

Figure 20:
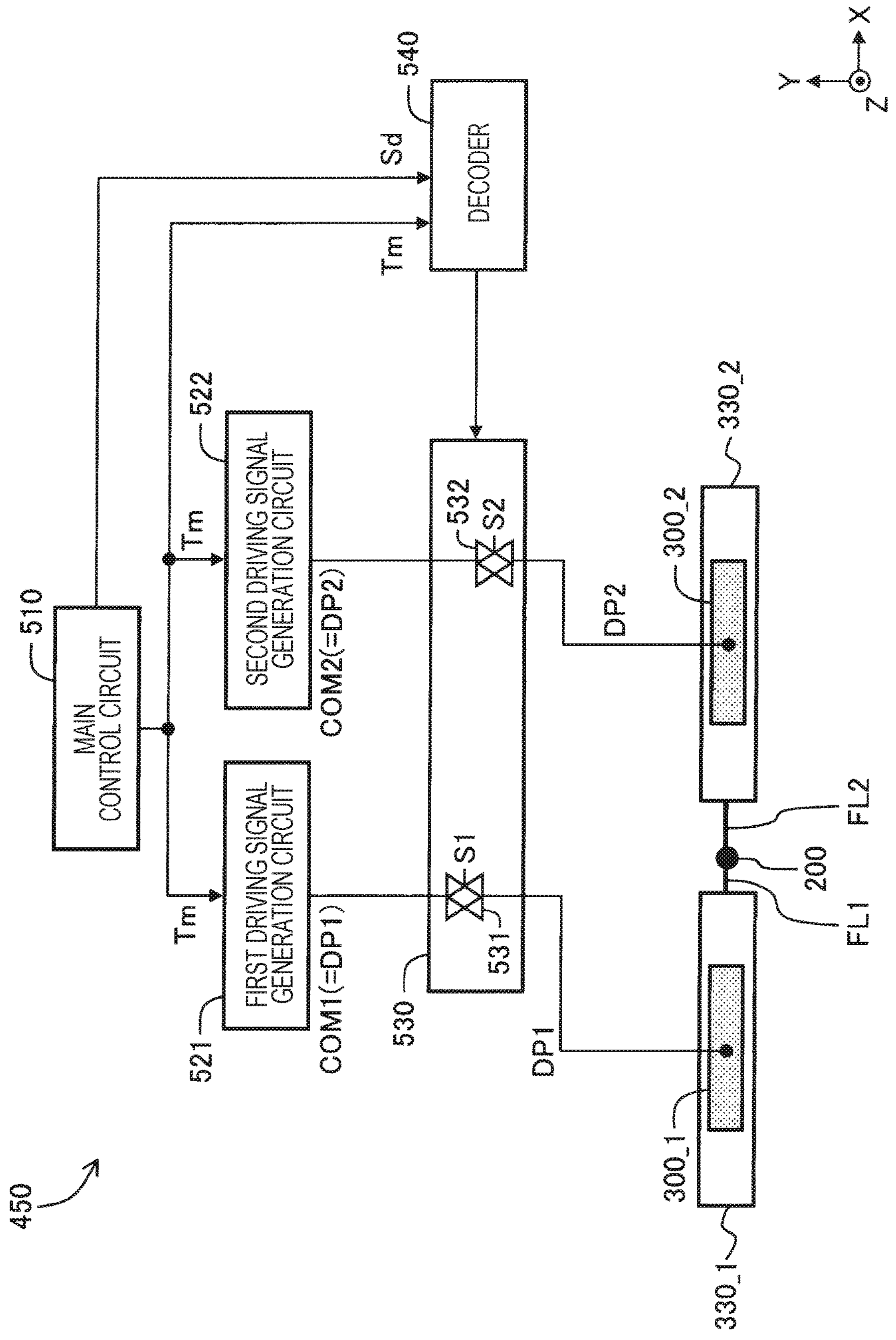
FIG. 20 is an explanatory diagram illustrating a head drive function of a control section according to a seventh embodiment.

FIG. 20 is an explanatory diagram illustrating a head drive function of the control section 450 according to the seventh embodiment. The seventh embodiment is mainly different from the sixth embodiment described above in that the two pressure chambers 330_1 and 330_2 are arranged in the X direction, and in that the nozzle 200 is disposed between the two pressure chambers 330_1 and 330_2 in the X direction, and has other apparatus configurations and control operations, which are substantially the same as those of the sixth embodiment. In plan view in the Z direction, the two pressure chambers 330_1 and 330_2 extend in the X direction, and the longitudinal directions thereof are parallel to the X direction. Further, the two pressure chambers 330_1 and 330_2 are arranged in the X direction.

In the seventh embodiment, similarly to the sixth embodiment, the flow path length FL1 from the first pressure chamber 330_1 to the nozzle 200 is also shorter than the flow path length FL2 from the second pressure chamber 330_2 to the nozzle 200. The position of the nozzle 200 can be set to any position other than the position illustrated in FIG. 19. For example, similarly to the sixth embodiment, the nozzle 200 may be disposed at a position overlapping the first pressure chamber 330_1 in plan view in the Z direction.

Similarly to the sixth embodiment described above, the seventh embodiment also has the features G13 and G14 described above. Further, the driving timings and waveform shapes of the driving pulses DP1 and DP2 of the seventh embodiment may be adjusted according to the above-described features G6 and G7. The seventh embodiment has the same effect as that of the first embodiment, and can improve the ejection efficiency of the liquid.

Modification Example 1

In each of the above-described aspects, the serial type liquid ejecting apparatus 400 that reciprocates the carriage 434 holding the liquid ejecting head 100 is exemplified. However, the present disclosure can also be applied to a line type liquid ejecting apparatus in which the plurality of nozzles 200 are distributed over the entire width of the medium PM. That is, the carriage that holds the liquid ejecting head 100 is not limited to a serial type carriage, and may be a structure that supports the liquid ejecting head 100 in a line type. In this case, for example, the plurality of liquid ejecting heads 100 are arranged side by side in the width direction of the medium PM, and the plurality of liquid ejecting heads 100 are collectively held by one carriage.

Modification Example 2

In each of the above-described aspects, the liquid ejecting apparatus 400 including the circulation mechanism 60 is exemplified. However, the liquid ejecting apparatus 400 may not include the circulation mechanism 60. That is, both the opening portions 161 and 162 of the housing section 160 are inlets for introducing the liquid from the liquid storage section 420, and both the first common liquid chamber 110 and the second common liquid chamber 120 may be used as flow paths for supplying the liquid supplied from the liquid storage section 420 to the nozzle 200.

Modification Example 3

In each of the above-described aspects, two, four, and six pressure chambers 330 are provided corresponding to one nozzle. However, an odd number (three, five, seven or the like) of pressure chambers 330 may be provided corresponding to one nozzle. Further, eight or more pressure chambers 330 may be provided corresponding to one nozzle.

Modification Example 4

In each of the above-described aspects, one coupling flow path 320 is coupled to each of the pressure chambers 331 to 334. However, the common coupling flow path 320 may be provided for the pressure chambers 331 and 332 coupled to the same first common liquid chamber 110. In other words, one coupling flow path 320 may be provided corresponding to the plurality of pressure chambers 330. The same applies to pressure chambers 333 and 334 coupled to the same second common liquid chamber 120. When considering four individual flow paths corresponding to the individual pressure chambers 331 to 334 in Modification example 4, for example, the first individual flow path does not include the coupling flow path 320. The second to fourth individual flow paths can also be grasped in the same manner.

Modification Example 5

In each of the above-described aspects, the coupling flow path 320 is a flow path extending in the Z direction.

However, the coupling flow path 320 may be a flow path extending in a direction intersecting the Z direction, and may be a flow path including both a part extending in the Z direction and a part extending in a direction intersecting the Z direction.

Modification Example 6

The liquid ejecting apparatus exemplified in the above-described aspects can be adopted in various devices such as a facsimile machine and a copier, in addition to a device dedicated to printing. However, the application of the liquid ejecting apparatus is not limited to printing. For example, a liquid ejecting apparatus that ejects a solution of a coloring material is used as a manufacturing device for forming a color filter of a display device such as a liquid crystal display panel. Further, the liquid ejecting apparatus that ejects a solution of a conductive material is used as a manufacturing device for forming wiring or electrodes on the wiring substrate. Further, a liquid ejecting apparatus that ejects a solution of an organic substance related to a living body is used, for example, as a manufacturing device for manufacturing a biochip.

Other Aspects

The present disclosure is not limited to the above-described embodiments and can be implemented with various aspects without departing from the spirit thereof. For example, the present disclosure can also be implemented in the following aspects. For example, the technical features in the aspects corresponding to the technical features in each aspect described below are to solve some or all of the above-described problems, or in order to achieve some or all of the above-described effects, replacement or combination can be performed as appropriate. Unless the technical features are described as essential in the present specification, deletion is possible as appropriate.

1. A first aspect of the present disclosure is a driving method of a liquid ejecting head. The liquid ejecting head includes a nozzle for ejecting a liquid, first and second pressure chambers communicating with the nozzle, a first driving element that changes the pressure in the first pressure chamber, and a second driving element that changes the pressure in the second pressure chamber. A first flow path length of a flow path from the first pressure chamber to the nozzle is shorter than a second flow path length of a flow path from the second pressure chamber to the nozzle. In the driving method of a liquid ejecting head, at least the first and second driving elements are driven to eject a liquid from the nozzle, and a driving timing of the second driving element is earlier than a driving timing of the first driving element.

According to this method, the shift of the pressure wave caused by the difference in the flow path length from the nozzle to the first and second pressure chambers can be reduced, and the ejection efficiency can be improved.

2. In the driving method, at least, a first driving pulse may be supplied to the first driving element and a second driving pulse may be supplied to the second driving element to eject a liquid from the nozzle. The timing at which the second driving pulse is applied to the second driving element may be earlier than the timing at which the first driving pulse is applied to the first driving element.

3. In the driving method, the liquid ejecting head may further include third and fourth pressure chambers, a communication flow path coupled to the nozzle and communicating with the first to fourth pressure chambers, a first common liquid chamber communicating with the first and second pressure chambers, a second common liquid chamber communicating with the third and fourth pressure chambers, a third driving element that changes a pressure in the third pressure chamber, and a fourth driving element that changes a pressure in the fourth pressure chamber. A fourth flow path length of a flow path from the fourth pressure chamber to the nozzle may be shorter than a third flow path length of a flow path from the third pressure chamber to the nozzle. At least the first to fourth driving elements may be driven to eject the liquid from the nozzle, and the driving timing of the third driving element may be earlier than the driving timing of the fourth driving element.

According to this method, the shift of the pressure wave caused by the difference in the flow path length from the nozzle to the first to fourth pressure chambers can be reduced, and the ejection efficiency can be improved.

4. In the driving method, at least, a first driving pulse may be supplied to the first driving element, a second driving pulse may be supplied to the second driving element, a third driving pulse may be supplied to the third driving element, and a fourth driving pulse may be supplied to the fourth driving element to eject a liquid from the nozzle. The timing at which the second driving pulse is applied to the second driving element may be earlier than the timing at which the first driving pulse is applied to the first driving element, and the timing at which the third driving pulse is applied to the third driving element may be earlier than the timing at which the fourth driving pulse is applied to the fourth driving element. The first driving pulse and the fourth driving pulse may be generated by the same first driving signal generation circuit, and the second driving pulse and the third driving pulse may be generated by the same second driving signal generation circuit.

5. In the driving method, the liquid ejecting head may further include a fifth pressure chamber communicating with the first common liquid chamber and communicating with the nozzle via the communication flow path, a sixth pressure chamber communicating with the second common liquid chamber and communicating with the nozzle via the communication flow path, a fifth driving element that changes a pressure in the fifth pressure chamber, and a sixth driving element that changes a pressure in the sixth pressure chamber. A fifth flow path length of a flow path from the fifth pressure chamber to the nozzle may be longer than the first flow path length and shorter than the second flow path length, and a sixth flow path length of a flow path from the sixth pressure chamber to the nozzle may be longer than the fourth flow path length and shorter than the third flow path length. The first to sixth driving elements may be driven to eject a liquid from the nozzle, and a driving timing of the fifth driving element may be earlier than a driving timing of the first driving element and later than a driving timing of the second driving element. A driving timing of the sixth driving element may be earlier than a driving timing of the fourth driving element and later than a driving timing of the third driving element.

6. In the driving method, a magnitude of a pressure change of a liquid in the second pressure chamber caused by driving the second driving element may be greater than a magnitude of a pressure change of a liquid in the first pressure chamber caused by driving the first driving element.

7. In the driving method, a magnitude of a pressure change of a liquid in the second pressure chamber caused by driving the second driving element may be greater than a magnitude of a pressure change of a liquid in the first pressure chamber caused by driving the first driving element. A magnitude of a pressure change of a liquid in the third pressure chamber caused by driving the third driving element may be greater than a magnitude of a pressure change of a liquid in the fourth pressure chamber caused by driving the fourth driving element.

8. A second aspect of the present disclosure is a driving method of a liquid ejecting head. The liquid ejecting head includes a nozzle for ejecting a liquid, first and second pressure chambers communicating with the nozzle, a first driving element that changes the pressure in the first pressure chamber, and a second driving element that changes the pressure in the second pressure chamber. A first flow path length of a flow path from the first pressure chamber to the nozzle is shorter than a second flow path length of a flow path from the second pressure chamber to the nozzle. In the driving method of a liquid ejecting head, at least the first and second driving elements are driven to eject a liquid from the nozzle, and a magnitude of a pressure change of a liquid in the second pressure chamber caused by driving the second driving element is greater than a magnitude of a pressure change of a liquid in the first pressure chamber caused by driving the first driving element.

9. In the driving method, the liquid ejecting head may further include a vibrating plate having a first vibration section provided with the first driving element on a surface opposite to a surface defining the first pressure chamber and a second vibration section provided with the second driving element on a surface opposite to a surface defining the second pressure chamber. Each of the first and second driving elements may be a piezoelectric element, and a displacement amount of the second vibration section may be greater than a displacement amount of the first vibration section.

10. In the driving method, at least, a first driving pulse may be supplied to the first driving element and a second driving pulse may be supplied to the second driving element to eject a liquid from the nozzle, and an amplitude of the second driving pulse may be greater than an amplitude of the first driving pulse.

11. In the driving method, the liquid ejecting head may further include third and fourth pressure chambers, a communication flow path coupled to the nozzle and communicating with the first to fourth pressure chambers, a first common liquid chamber communicating with the first and second pressure chambers, a second common liquid chamber communicating with the third and fourth pressure chambers, a third driving element that changes a pressure in the third pressure chamber, and a fourth driving element that changes a pressure in the fourth pressure chamber. A fourth flow path length of a flow path from the fourth pressure chamber to the nozzle may be shorter than a third flow path length of a flow path from the third pressure chamber to the nozzle. At least the first to fourth driving elements may be driven to eject a liquid from the nozzle, and a magnitude of a pressure change of a liquid in the third pressure chamber caused by driving the third driving element may be greater than a magnitude of a pressure change of a liquid in the fourth pressure chamber caused by driving the fourth driving element.

According to this method, for example, when the same pressure change is generated in the first pressure chamber and the second pressure chamber having different flow path lengths, at the nozzle position, the amplitude of the pressure wave of the second pressure chamber having a longer flow path length further decreases. Therefore, the pressure wave from the first pressure chamber is transmitted toward the second pressure chamber, which may cause a concern that the ejection efficiency decreases. However, by making the pressure change generated in the second pressure chamber having a long flow path length greater than that in the first pressure chamber, it is possible to suppress transmission of the pressure wave from the first pressure chamber toward the second pressure chamber, and to improve ejection efficiency.

12. In the driving method, at least, a first driving pulse may be supplied to the first driving element, a second driving pulse may be supplied to the second driving element, a third driving pulse may be supplied to the third driving element, and a fourth driving pulse may be supplied to the fourth driving element to eject a liquid from the nozzle. An amplitude of the second driving pulse may be greater than an amplitude of the first driving pulse, and an amplitude of the third driving pulse may be greater than an amplitude of the fourth driving pulse. The first driving pulse and the fourth driving pulse may be generated by the same first driving signal generation circuit, and the second driving pulse and the third driving pulse may be generated by the same second driving signal generation circuit.

13. In the driving method, the liquid ejecting head may further include a fifth pressure chamber communicating with the first common liquid chamber and communicating with the nozzle via the communication flow path, a sixth pressure chamber communicating with the second common liquid chamber and communicating with the nozzle via the communication flow path, a fifth driving element that changes a pressure in the fifth pressure chamber, and a sixth driving element that changes a pressure in the sixth pressure chamber. A fifth flow path length of a flow path from the fifth pressure chamber to the nozzle may be longer than the first flow path length and shorter than the second flow path length, and a sixth flow path length of a flow path from the sixth pressure chamber to the nozzle may be longer than the fourth flow path length and shorter than the third flow path length. The first to sixth driving elements may be driven to eject a liquid from the nozzle, a magnitude of a pressure change of a liquid in the fifth pressure chamber caused by driving the fifth driving element may be greater than the magnitude of a pressure change of a liquid in the first pressure chamber caused by driving the first driving element, and less than the magnitude of a pressure change of a liquid in the second pressure chamber caused by driving the second driving element. A magnitude of a pressure change of a liquid in the sixth pressure chamber caused by driving the sixth driving element may be greater than a magnitude of a pressure change of a liquid in the fourth pressure chamber caused by driving the fourth driving element, and less than a magnitude of a pressure change of a liquid in the third pressure chamber caused by driving the third driving element.

14. In the driving method, in plan view, a first joining position of a first pressure wave transmitted from the first pressure chamber to the nozzle by driving the first driving element and a second pressure wave transmitted from the second pressure chamber to the nozzle by driving the second driving element, may be closer to each of an end portion of the first pressure chamber and an end portion of the second pressure chamber than the nozzle. In plan view, a second joining position of a third pressure wave transmitted from the third pressure chamber to the nozzle by driving the third driving element and a fourth pressure wave transmitted from the fourth pressure chamber to the nozzle by driving the fourth driving element, may be closer to each of an end portion of the third pressure chamber and an end portion of the fourth pressure chamber than the nozzle.

15. In the driving method, the first flow path length and the fourth flow path length may be the same, and the second flow path length and the third flow path length may be the same.

16. In the driving method, the first pressure chamber and the second pressure chamber may be arranged side by side in a first direction, the third pressure chamber and the fourth pressure chamber may be arranged side by side in the first direction, and the first and second pressure chambers and the third and fourth pressure chambers may be arranged to be shifted in a second direction intersecting the first direction. The first pressure chamber may be disposed between the third pressure chamber and the fourth pressure chamber, and the fourth pressure chamber may be disposed between the first pressure chamber and the second pressure chamber.

17. In the above driving method, the first common liquid chamber may be a flow path for supplying a liquid to the first and second pressure chambers, and the second common liquid chamber may be a flow path for collecting a liquid from the third and fourth pressure chambers.

18. A third aspect of the present disclosure is a liquid ejecting apparatus including a liquid ejecting head and a control section that controls an ejection operation of the liquid ejecting head. In the liquid ejecting head, a nozzle for ejecting a liquid, first and second pressure chambers communicating with the nozzle, a first driving element that changes a pressure in the first pressure chamber, and a second driving element that changes a pressure in the second pressure chamber are provided, and a first flow path length of a flow path from the first pressure chamber to the nozzle is shorter than a second flow path length of a flow path from the second pressure chamber to the nozzle. In the control section, at least the first and second driving elements are driven to eject a liquid from the nozzle, and a driving timing of the second driving element is earlier than a driving timing of the first driving element.

19. A fourth aspect of the present disclosure is a liquid ejecting apparatus including a liquid ejecting head and a control section that controls an ejection operation of the liquid ejecting head. In the liquid ejecting head, a nozzle for ejecting a liquid, first and second pressure chambers communicating with the nozzle, a first driving element that changes a pressure in the first pressure chamber, and a second driving element that changes a pressure in the second pressure chamber are provided, and a first flow path length of a flow path from the first pressure chamber to the nozzle is shorter than a second flow path length of a flow path from the second pressure chamber to the nozzle. In the control section, at least the first and second driving elements are driven to eject a liquid from the nozzle, and a magnitude of a pressure change of a liquid in the second pressure chamber caused by driving the second driving element is greater than a magnitude of a pressure change of a liquid in the first pressure chamber caused by driving the first driving element.

The present disclosure can also be implemented in various aspects other than the driving method of a liquid ejecting head and the liquid ejecting apparatus. For example, the present disclosure can be implemented in the aspect of a method for manufacturing a liquid ejecting head and a liquid ejecting apparatus, a method for controlling the liquid ejecting head and the liquid ejecting apparatus, a computer program for implementing the control method, and a non-temporary recording medium that records the computer program.

What is claimed is:

1. A driving method of a liquid ejecting head including a nozzle configured to ejecting a liquid, first and second pressure chambers communicating with the nozzle, a first driving element configured to change a pressure in the first pressure chamber, and a second driving element configured to change a pressure in the second pressure chamber, in which a first flow path length of a flow path from the first pressure chamber to the nozzle is shorter than a second flow path length of a flow path from the second pressure chamber to the nozzle, and at least the first and second driving elements are driven to eject a liquid from the nozzle, the method wherein a driving timing of the second driving element is earlier than a driving timing of the first driving element.

2. The driving method of a liquid ejecting head according to claim 1, wherein at least, a first driving pulse is supplied to the first driving element and a second driving pulse is supplied to the second driving element to eject a liquid from the nozzle, and a timing of applying the second driving pulse to the second driving element is earlier than a timing of applying the first driving pulse to the first driving element.

3. The driving method of a liquid ejecting head according to claim 1, wherein the liquid ejecting head further includes third and fourth pressure chambers, a communication flow path coupled to the nozzle and communicating with the first to fourth pressure chambers, a first common liquid chamber communicating with the first and second pressure chambers, a second common liquid chamber communicating with the third and fourth pressure chambers, a third driving element configured to change a pressure in the third pressure chamber, and a fourth driving element configured to change a pressure in the fourth pressure chamber, a fourth flow path length of a flow path from the fourth pressure chamber to the nozzle is shorter than a third flow path length of a flow path from the third pressure chamber to the nozzle, at least the first to fourth driving elements are driven to eject a liquid from the nozzle, and a driving timing of the third driving element is earlier than a driving timing of the fourth driving element.

4. The driving method of a liquid ejecting head according to claim 3, wherein at least, a first driving pulse is supplied to the first driving element, a second driving pulse is supplied to the second driving element, a third driving pulse is supplied to the third driving element, and a fourth driving pulse is supplied to the fourth driving element to eject a liquid from the nozzle, a timing of applying the second driving pulse to the second driving element is earlier than a timing of applying the first driving pulse to the first driving element, a timing of applying the third driving pulse to the third driving element is earlier than a timing of applying the fourth driving pulse to the fourth driving element, the first driving pulse and the fourth driving pulse are generated by the same first driving signal generation circuit, and the second driving pulse and the third driving pulse are generated by the same second driving signal generation circuit.

5. The driving method of a liquid ejecting head according to claim 3, wherein the liquid ejecting head further includes a fifth pressure chamber communicating with the first common liquid chamber and communicating with the nozzle via the communication flow path, a sixth pressure chamber communicating with the second common liquid chamber and communicating with the nozzle via the communication flow path, a fifth driving element configured to change a pressure in the fifth pressure chamber, and a sixth driving element configured to change a pressure in the sixth pressure chamber, a fifth flow path length of a flow path from the fifth pressure chamber to the nozzle is longer than the first flow path length and shorter than the second flow path length, a sixth flow path length of a flow path from the sixth pressure chamber to the nozzle is longer than the fourth flow path length and shorter than the third flow path length, the first to sixth driving elements are driven to eject a liquid from the nozzle, a driving timing of the fifth driving element is earlier than a driving timing of the first driving element and later than a driving timing of the second driving element, and a driving timing of the sixth driving element is earlier than a driving timing of the fourth driving element and later than a driving timing of the third driving element.

6. The driving method of a liquid ejecting head according to claim 3, wherein a magnitude of a pressure change of a liquid in the second pressure chamber caused by driving the second driving element is greater than a magnitude of a pressure change of a liquid in the first pressure chamber caused by driving the first driving element, and a magnitude of a pressure change of a liquid in the third pressure chamber caused by driving the third driving element is greater than a magnitude of a pressure change of a liquid in the fourth pressure chamber caused by driving the fourth driving element.

7. The driving method of a liquid ejecting head according to claim 3, wherein in plan view, a first joining position of a first pressure wave transmitted from the first pressure chamber to the nozzle by driving the first driving element and a second pressure wave transmitted from the second pressure chamber to the nozzle by driving the second driving element, is closer to each of an end portion of the first pressure chamber and an end portion of the second pressure chamber than to the nozzle, and in plan view, a second joining position of a third pressure wave transmitted from the third pressure chamber to the nozzle by driving the third driving element and a fourth pressure wave transmitted from the fourth pressure chamber to the nozzle by driving the fourth driving element, is closer to each of an end portion of the third pressure chamber and an end portion of the fourth pressure chamber than to the nozzle.

8. The driving method of a liquid ejecting head according to claim 3, wherein the first flow path length and the fourth flow path length are the same, and the second flow path length and the third flow path length are the same.

9. The driving method of a liquid ejecting head according to claim 3, wherein the first pressure chamber and the second pressure chamber are arranged side by side in a first direction, the third pressure chamber and the fourth pressure chamber are arranged side by side in the first direction, the first and second pressure chambers and the third and fourth pressure chambers are arranged to be shifted in a second direction intersecting the first direction, the first pressure chamber is disposed between the third pressure chamber and the fourth pressure chamber, and the fourth pressure chamber is disposed between the first pressure chamber and the second pressure chamber.

10. The driving method of a liquid ejecting head according to claim 3, wherein the first common liquid chamber is a flow path for supplying a liquid to the first and second pressure chambers, and the second common liquid chamber is a flow path for collecting a liquid from the third and fourth pressure chambers.

11. The driving method of a liquid ejecting head according to claim 1, wherein a magnitude of a pressure change of a liquid in the second pressure chamber caused by driving the second driving element is greater than a magnitude of a pressure change of a liquid in the first pressure chamber caused by driving the first driving element.

12. The driving method of a liquid ejecting head according to claim 1, wherein the liquid ejecting head further includes a communication flow path coupled to the nozzle and communicating with the first and second pressure chambers, a first common liquid chamber communicating with the first and second pressure chambers, a first coupling flow path coupling the first common liquid chamber and the first pressure chamber, and a second coupling flow path coupling the first common liquid chamber and the second pressure chamber, a flow path length of the first coupling flow path and a flow path length of the second coupling flow path are the same.

13. The driving method of a liquid ejecting head according to claim 1, wherein the liquid ejecting head further includes a communication flow path coupled to the nozzle and communicating with the first and second pressure chambers, a first common liquid chamber communicating with the first pressure chamber, a second common liquid chamber communicating with the second pressure chamber, a first coupling flow path coupling the first common liquid chamber and the first pressure chamber, and a second coupling flow path coupling the second common liquid chamber and the second pressure chamber, a flow path length of the first coupling flow path and a flow path length of the second coupling flow path are the same.

14. A driving method of a liquid ejecting head including a nozzle configured to eject a liquid, first and second pressure chambers communicating with the nozzle, a first driving element configured to change a pressure in the first pressure chamber, and a second driving element configured to change a pressure in the second pressure chamber, in which a first flow path length of a flow path from the first pressure chamber to the nozzle is shorter than a second flow path length of a flow path from the second pressure chamber to the nozzle, and at least the first and second driving elements are driven to eject a liquid from the nozzle, the method wherein a magnitude of a pressure change of a liquid in the second pressure chamber caused by driving the second driving element is greater than a magnitude of a pressure change of a liquid in the first pressure chamber caused by driving the first driving element.

15. The driving method of a liquid ejecting head according to claim 14, wherein the liquid ejecting head further includes a vibrating plate having a first vibration section provided with the first driving element on a surface that is opposite from a surface defining the first pressure chamber and a second vibration section provided with the second driving element on a surface that is opposite from a surface defining the second pressure chamber, each of the first and second driving elements is a piezoelectric element, and a displacement amount of the second vibration section is greater than a displacement amount of the first vibration section.

16. The driving method of a liquid ejecting head according to claim 14, wherein at least, a first driving pulse is supplied to the first driving element and a second driving pulse is supplied to the second driving element to eject a liquid from the nozzle, and an amplitude of the second driving pulse is greater than an amplitude of the first driving pulse.

17. The driving method of a liquid ejecting head according to claim 14, wherein the liquid ejecting head further includes third and fourth pressure chambers, a communication flow path coupled to the nozzle and communicating with the first to fourth pressure chambers, a first common liquid chamber communicating with the first and second pressure chambers, a second common liquid chamber communicating with the third and fourth pressure chambers, a third driving element configured to change a pressure in the third pressure chamber, and a fourth driving element configured to change a pressure in the fourth pressure chamber, a fourth flow path length of a flow path from the fourth pressure chamber to the nozzle is shorter than a third flow path length of a flow path from the third pressure chamber to the nozzle, at least the first to fourth driving elements are driven to eject a liquid from the nozzle, and a magnitude of a pressure change of a liquid in the third pressure chamber caused by driving the third driving element is greater than a magnitude of a pressure change of a liquid in the fourth pressure chamber caused by driving the fourth driving element.

18. The driving method of a liquid ejecting head according to claim 17, wherein at least, a first driving pulse is supplied to the first driving element, a second driving pulse is supplied to the second driving element, a third driving pulse is supplied to the third driving element, and a fourth driving pulse is supplied to the fourth driving element to eject a liquid from the nozzle, an amplitude of the second driving pulse is greater than an amplitude of the first driving pulse, an amplitude of the third driving pulse is greater than an amplitude of the fourth driving pulse, the first driving pulse and the fourth driving pulse are generated by the same first driving signal generation circuit, and the second driving pulse and the third driving pulse are generated by the same second driving signal generation circuit.

19. The driving method of a liquid ejecting head according to claim 17, wherein the liquid ejecting head further includes a fifth pressure chamber communicating with the first common liquid chamber and communicating with the nozzle via the communication flow path, a sixth pressure chamber communicating with the second common liquid chamber and communicating with the nozzle via the communication flow path, a fifth driving element configured to change a pressure in the fifth pressure chamber, and a sixth driving element configured to change a pressure in the sixth pressure chamber, a fifth flow path length of a flow path from the fifth pressure chamber to the nozzle is longer than the first flow path length and shorter than the second flow path length, a sixth flow path length of a flow path from the sixth pressure chamber to the nozzle is longer than the fourth flow path length and shorter than the third flow path length, the first to sixth driving elements are driven to eject a liquid from the nozzle, a magnitude of a pressure change of a liquid in the fifth pressure chamber caused by driving the fifth driving element is greater than the magnitude of a pressure change of a liquid in the first pressure chamber caused by driving the first driving element, and less than the magnitude of a pressure change of a liquid in the second pressure chamber caused by driving the second driving element, and a magnitude of a pressure change of a liquid in the sixth pressure chamber caused by driving the sixth driving element is greater than a magnitude of a pressure change of a liquid in the fourth pressure chamber caused by driving the fourth driving element, and less than a magnitude of a pressure change of a liquid in the third pressure chamber caused by driving the third driving element.

20. A liquid ejecting apparatus comprising:

a liquid ejecting head; and a control section that controls an ejection operation of the liquid ejecting head, wherein in the liquid ejecting head, a nozzle for ejecting a liquid, first and second pressure chambers communicating with the nozzle, a first driving element that changes a pressure in the first pressure chamber, and a second driving element that changes a pressure in the second pressure chamber are provided, and a first flow path length of a flow path from the first pressure chamber to the nozzle is shorter than a second flow path length of a flow path from the second pressure chamber to the nozzle, and in the control section, at least the first and second driving elements are driven to eject a liquid from the nozzle, and a driving timing of the second driving element is earlier than a driving timing of the first driving element, or a magnitude of a pressure change of a liquid in the second pressure chamber caused by driving the second driving element is greater than a magnitude of a pressure change of a liquid in the first pressure chamber caused by driving the first driving element.

* * * * *